(12) United States Patent
Bates et al.

(10) Patent No.: US 6,342,908 B1
(45) Date of Patent: Jan. 29, 2002

(54) PROGRESSIVE WINDOW ORGANIZATION

(75) Inventors: Cary Lee Bates; Paul Reuben Day, both of Rochester; Jeffrey Michael Ryan, Byron, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/273,972

(22) Filed: Mar. 22, 1999

(51) Int. Cl.[7] .............................................. G06K 15/00
(52) U.S. Cl. ........................................ 345/798; 345/789
(58) Field of Search ................................ 345/344, 345, 345/346, 340, 348, 349, 379, 795, 796, 798, 837, 800, 801, 802, 811, 817, 772, 789

(56) References Cited

U.S. PATENT DOCUMENTS

| | | | | |
|---|---|---|---|---|
| 5,564,004 A | * | 10/1996 | Grossman et al. | 345/348 |
| 5,920,316 A | * | 7/1999 | Oran et al. | 345/348 |
| 5,949,418 A | * | 9/1999 | Shields et al. | 345/342 |
| 6,002,397 A | * | 12/1999 | Jaaskelainen et al. | 345/340 |
| 6,025,841 A | * | 2/2000 | Finkelstein et al. | 345/342 |
| 6,184,883 B1 | * | 2/2001 | Bates et al. | 345/345 |

* cited by examiner

*Primary Examiner*—Steven Sax
(74) *Attorney, Agent, or Firm*—Owen J. Gamon; Grant A. Johnson

(57) ABSTRACT

A controller displays windows on a display. At any one time, one of the windows can be in focus. Each of the windows has an original position and an original size on the display. The controller determines, for each window, an elapsed time since it was in focus, and changes the position and size of each window in proportion to its elapsed time. The controller shrinks each window that is not in focus and moves it away from its original position and toward the boundary of the desktop in proportion to the elapsed time since it was in focus. Thus, the windows that the user is using heavily tend to stay large and near their original position while windows that the user is using lightly tend to shrink and move toward the boundary of the screen.

37 Claims, 28 Drawing Sheets

Time = t1 time = t8

PROGRESSIVE WINDOW ORGANIZATION

FIELD OF THE INVENTION

The present invention relates in general to improved information processing systems. In particular, the present invention relates to a method and system for moving windows on a display.

BACKGROUND

Early computers were controlled by batch operating systems. These computers had limited interaction with users of the system. An operator needed to load the job to be run and then send the output to a printer. With the advent of time-sharing operating systems, such as the IBM System 370, interactive computing became the norm. Time-sharing operating systems allowed many users to use the computer's resources simultaneously, so that all users of the system appeared to have their own computer system. All users had their own terminal, which was connected to the central computer system. This terminal typically consisted of a display and a keyboard. To the user, this terminal appeared to be an interactive computer system in its own right.

With the advent of computer systems that allowed truly interactive computer applications came a proliferation of user interfaces. Some of these interfaces were command driven, others where menu driven, but they all only allowed the user to work on only one task or application from a given terminal at a time.

Today, the state-of-the-art for computer systems and user interfaces has advanced beyond the single-task interface. Inexpensive, personal computers and workstations with powerful graphics processors and multi-tasking operating systems have changed the way users interact with computer systems. With these operating systems, the user can simultaneously work on many tasks at once, each task being confined to its own display panel, called a window. This interface allows the presentation of multiple windows in potentially overlapping relationships on a display screen. The user can thus retain a window on the screen while temporarily superimposing another window entirely or partially overlapping the retained window. This enables users to divert their attention from a first window to one or more secondary windows for assistance or reference, so that overall user interaction can be improved. The processor that controls this operation must retain the information relating to the original window and any subsequent, overlaid windows. There may be many windows with active applications running at once. As the number of open windows becomes large and the screen becomes cluttered, it becomes more and more difficult for the user to find the desired window because it may be overlaid by several other windows.

In order to find the desired window, current systems allow the user to reduce overlying windows to icons (symbols that represent the windows) by clicking the mouse button while the mouse cursor is positioned on a minimize button. This method suffers from the disadvantage that when the window is reduced to an icon, the user cannot see the window contents. Many times when an application in a window is running, the user might wish to refer to the window contents. By seeing all or a portion of the window contents, the user has a better chance of determining when the application is complete or needs attention.

In an attempt to address these problems of minimization, some operating systems create a "task bar", which contains icons for all running tasks regardless of whether the tasks are minimized, maximized, or take up some portion of the desktop. The task bar is always present, regardless of the amount of space that the windows consume on the remaining area of the desktop. When the user selects an icon in the task bar, the operating system brings that task to the foreground of the desktop. The task bar suffers from the problem that it is an all-or-nothing solution; that is, in order to determine the contents of the window, the user must bring the entire window to the foreground. Further, the user might not be able to determine which is the desired window by examining the icons in the task bar, and thus might repeatedly need to bring different windows to the foreground.

Another method of finding the desired window is for the user to use the mouse pointer to "grab" overlying windows, "drag" them, and "drop" them to the side or partially off the screen. In this method, the user positions the mouse pointer in some portion of the window (such as the title bar) and clicks and holds a mouse button (the grabbing action). The window then moves with the mouse pointer (the dragging action). When the window is positioned in the desired area, the user releases the mouse button (the dropping action). Grabbing, dragging, and dropping take too much of the user's time and divert the user's attention from the primary work inside the desired window.

For the foregoing reasons, there is a need for a windowing interface that permits the user to quickly and easily find the window of interest amidst the clutter of the desktop.

SUMMARY OF THE INVENTION

The invention is a method, program product, and system for displaying windows. In the preferred embodiment, a controller displays windows on a display. At any one time, one of the windows can be in focus. Each of the windows has an original position and an original size on the display. The controller determines, for each window, an elapsed time since it was in focus, and changes the position and size of each window in proportion to its elapsed time. The controller shrinks each window that is not in focus and moves it away from its original position and toward the boundary of the desktop in proportion to the elapsed time since it was in focus. Thus, the windows that the user is using heavily tend to stay large and near their original position while windows that the user is using lightly tend to shrink and move toward the boundary of the screen.

DESCRIPTION OF THE PREFERRED EMBODIMENT

Detailed Description

Figure 1:
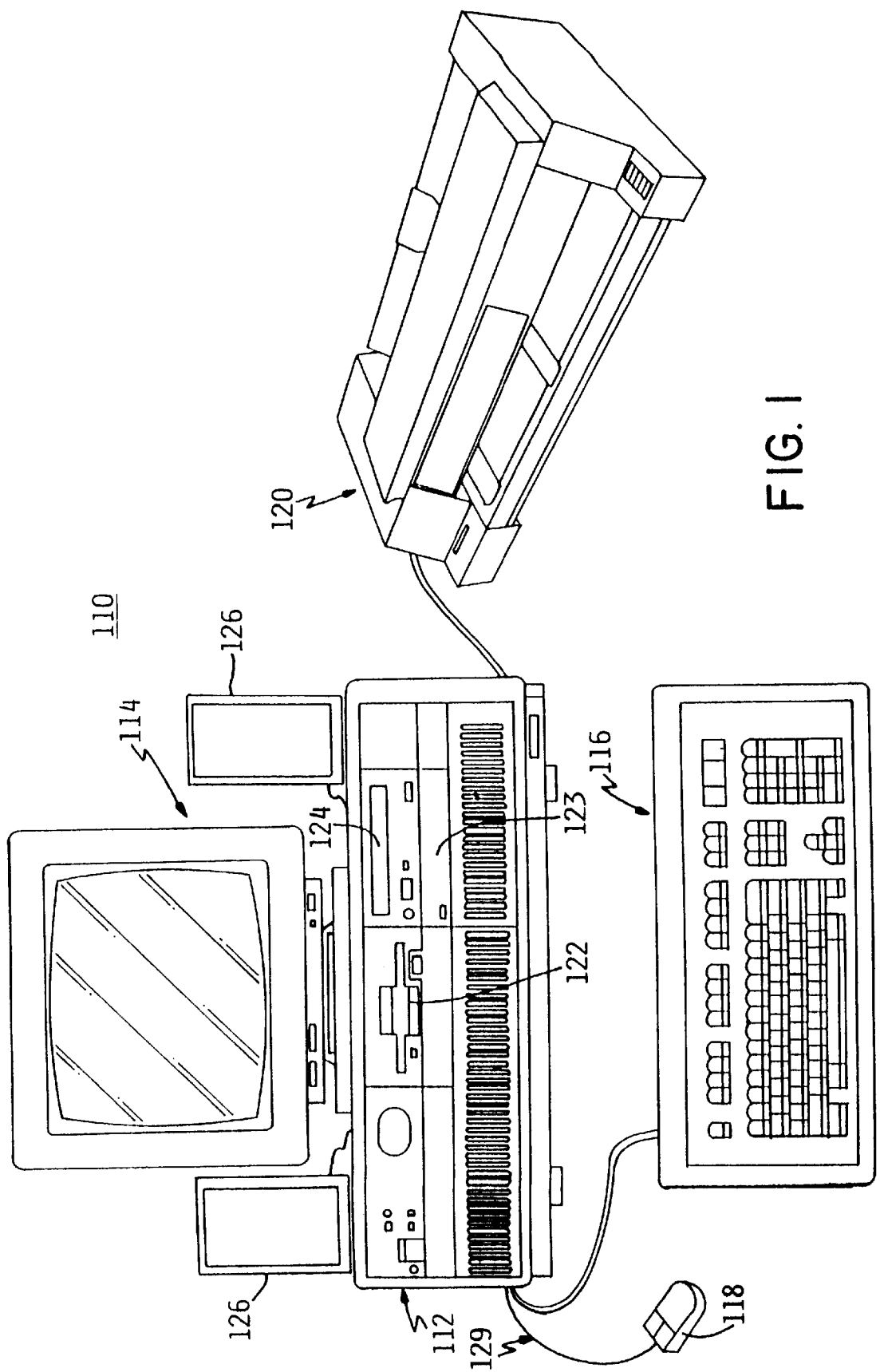
FIG. 1 is a pictorial representation of a computer system that can be utilized to implement a preferred embodiment.

With reference now to the figures and in particular with reference to FIG. 1, there is depicted an embodiment of a computer system that can be utilized to implement the preferred embodiment. Computer system 110 includes processing unit 112, display device 114, keyboard 116, pointing device 118, printer 120, and speakers 126. Processing unit 112 receives input data from input devices such as keyboard 116, pointing device 118, and local area network interfaces (not illustrated) and presents output data to a user via display device 114, printer 120, and speakers 126.

Keyboard 116 is that part of computer system 110 that resembles a typewriter keyboard and that enables a user to control particular aspects of the computer. Because information flows in one direction, from keyboard 114 to processing unit 112, keyboard 116 functions as an input-only device. Functionally, keyboard 116 represents half of a complete input/output device, the output half being video display terminal 114. Keyboard 116 includes a standard set of printable characters presented in a "QWERTY" pattern typical of most typewriters. In addition, keyboard 116 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video-display terminal 114.

Video-display terminal 114 is the visual output of computer system 110. As indicated herein, video-display terminal 114 can be a cathode-ray tube (CRT) based video display well-known in the art of computer hardware. But, with a portable or notebook-based computer, video-display terminal 114 can be replaced with a liquid crystal display (LCD) based or gas, plasma-based, flat-panel display.

Pointing device 118 is preferably utilized in conjunction with a graphical user-interface (GUI) in which hardware components and software objects are controlled through the selection and the manipulation of associated, graphical objects displayed within display device 114. Although computer system 110 is illustrated with a mouse for pointing device 118, other graphical-pointing devices such as a graphic tablet, joystick, track ball, touch pad, or track pad could also be utilized. Pointing device 118 features a casing with a flat bottom that can be gripped by a human hand. Pointing device 118 can include buttons on the top, a multidirectional-detection device such as a ball on the bottom, and cable 129 that connects pointing device 118 to processing unit 112.

To support storage and retrieval of data, processing unit 112 further includes diskette drive 122, hard-disk drive 123, and CD-ROM drive 124, which are interconnected with other components of processing unit 112, and which are further described below under the description for FIG. 2.

Computer system 110 can be implemented utilizing any suitable computer such as the IBM Aptiva computer, a product of International Business Machines Corporation, located in Armonk, N.Y. But, a preferred embodiment of the present invention can apply to any hardware configuration that allows the display of windows, regardless of whether the computer system is a complicated, multi-user computing apparatus, a single-user workstation, or a network appliance that does not have non-volatile storage of its own.

Figure 2:
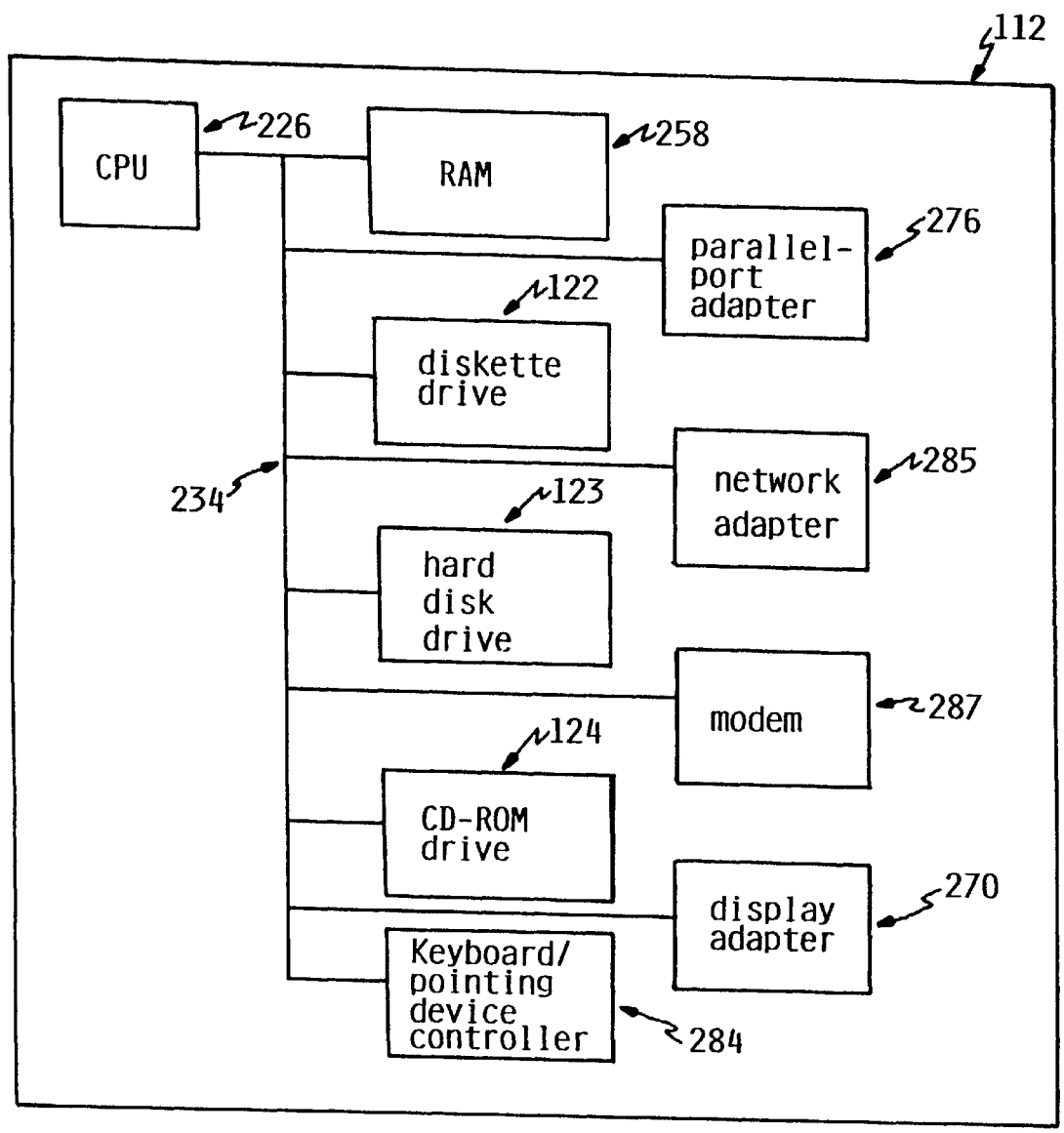
FIG. 2 is a block diagram of a representative hardware environment of the processing unit of the computer system illustrated in FIG. 1.

Referring to FIG. 2, there is depicted a block diagram of the principal components of processing unit 112. CPU 226 is connected via system bus 234 to RAM (Random Access Memory) 258, diskette drive 122, hard-disk drive 123, CD-ROM drive 124, keyboard/pointing-device controller 284, parallel-port adapter 276, network adapter 285, display adapter 270, and modem 287. Although the various components of FIG. 2 are drawn as single entities, each may consist of a plurality of entities and may exist at multiple levels.

Processing unit 112 includes central processing unit (CPU) 226, which executes instructions. CPU 226 includes the portion of computer system 110 that controls the operation of the entire computer system, including executing the arithmetical and logical functions contained in a particular computer program. Although not depicted in FIG. 2, CPU 226 typically includes a control unit that organizes data and program storage in a computer memory and transfers the data and other information between the various parts of the computer system. CPU 226 generally includes an arithmetic unit that executes the arithmetical and logical operations, such as addition, comparison, and multiplication. CPU 226 accesses data and instructions from and stores data to volatile RAM 258.

CPU 226 can be implemented as one of the 80X86 or Pentium processors, or any other type of processor, which are available from a number of vendors. Although computer system 110 is shown to contain only a single CPU and a single system bus, the present invention applies equally to computer systems that have multiple CPUs and to computer systems that have multiple buses that each perform different functions in different ways.

RAM 258 comprises a number of individual, volatile-memory modules that store segments of operating system and application software while power is supplied to computer system 110. The software segments are partitioned into one or more virtual-memory pages that each contain a uniform number of virtual-memory addresses. When the execution of software requires more pages of virtual memory than can be stored within RAM 258, pages that are not currently needed are swapped with the required pages, which are stored within non-volatile storage devices 122 or 123. RAM 258 is a type of memory designed such that the location of data stored in it is independent of the content. Also, any location in RAM 258 can be accessed directly without needing to start from the beginning.

Hard-disk drive 123 and diskette drive 122 are electromechanical devices that read from and write to disks. The main components of a disk drive are a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 110. A disk itself is typically a round, flat piece of flexible plastic (e.g., floppy disk) or inflexible metal (e.g. hard disk) coated with a magnetic material that can be electrically influenced to hold information recorded in digital form. A disk is, in most computers, the primary method for storing data on a permanent or semipermanent basis. Because the magnetic coating of the disk must be protected from damage and contamination, a floppy disk (e.g., 5.25 inch) or micro-floppy disk (e.g., 3.5 inch) is encased in a protective plastic jacket. But, any size of disk could be used. A hard disk, which is very finely machined, is typically enclosed in a rigid case and can be exposed only in a dust free environment.

Keyboard/pointing-device controller 284 interfaces processing unit 112 with keyboard 116 and graphical-pointing device 118. In an alternative embodiment, keyboard 116 and graphical-pointing device 118 have separate controllers.

Display adapter 270 translates graphics data from CPU 226 into video signals utilized to drive display device 114.

Finally, processing unit 112 includes network adapter 285, modem 287, and parallel-port adapter 276, which facilitate communication between computer system 110 and peripheral devices or other computer systems. Parallel-port adapter 276 transmits printer-control signals to printer 120 through a parallel port. Network adapter 285 connects computer system 110 to an unillustrated local area network (LAN). A LAN provides a user of computer system 110 with a means of electronically communicating information, including software, with a remote computer or a network logical-storage device. In addition, a LAN supports distributed processing, which enables computer system 110 to share a task with other computer systems linked to the LAN.

Modem 287 supports communication between computer system 110 and another computer system over a standard telephone line. Furthermore, through modem 287, computer system 110 can access other sources such as a server, an electronic bulletin board, and the Internet or World Wide Web.

The configuration depicted in FIG. 1 is but one possible implementation of the components depicted in FIG. 2. Portable computers, laptop computers, and network computers or Internet appliances are other possible configurations. The hardware depicted in FIG. 2 may vary for specific applications. For example, other peripheral devices such as optical-disk media, audio adapters, or chip-programming devices, such as PAL or EPROM programming devices well-known in the art of computer hardware, may be utilized in addition to or in place of the hardware already depicted.

As will be described in detail below, aspects of the preferred embodiment pertain to specific method steps implementable on computer systems. In an alternative embodiment, the invention may be implemented as a computer program-product for use with a computer system. The programs defining the functions of the preferred embodiment can be delivered to a computer via a variety of signal-bearing media, which include, but are not limited to, (a) information permanently stored on non-writable storage media (e.g., read-only memory devices within a computer such as CD-ROM disks readable by CD-ROM drive 124); (b) alterable information stored on writable storage media (e.g., floppy disks within diskette drive 122 or hard-disk drive 123); or (c) information conveyed to a computer by a communications media, such as through a computer or telephone network, including wireless communications. Such signal-bearing media, when carrying computer-readable instructions that direct the functions of the present invention, represent alternative embodiments of the present invention.

Figure 3:
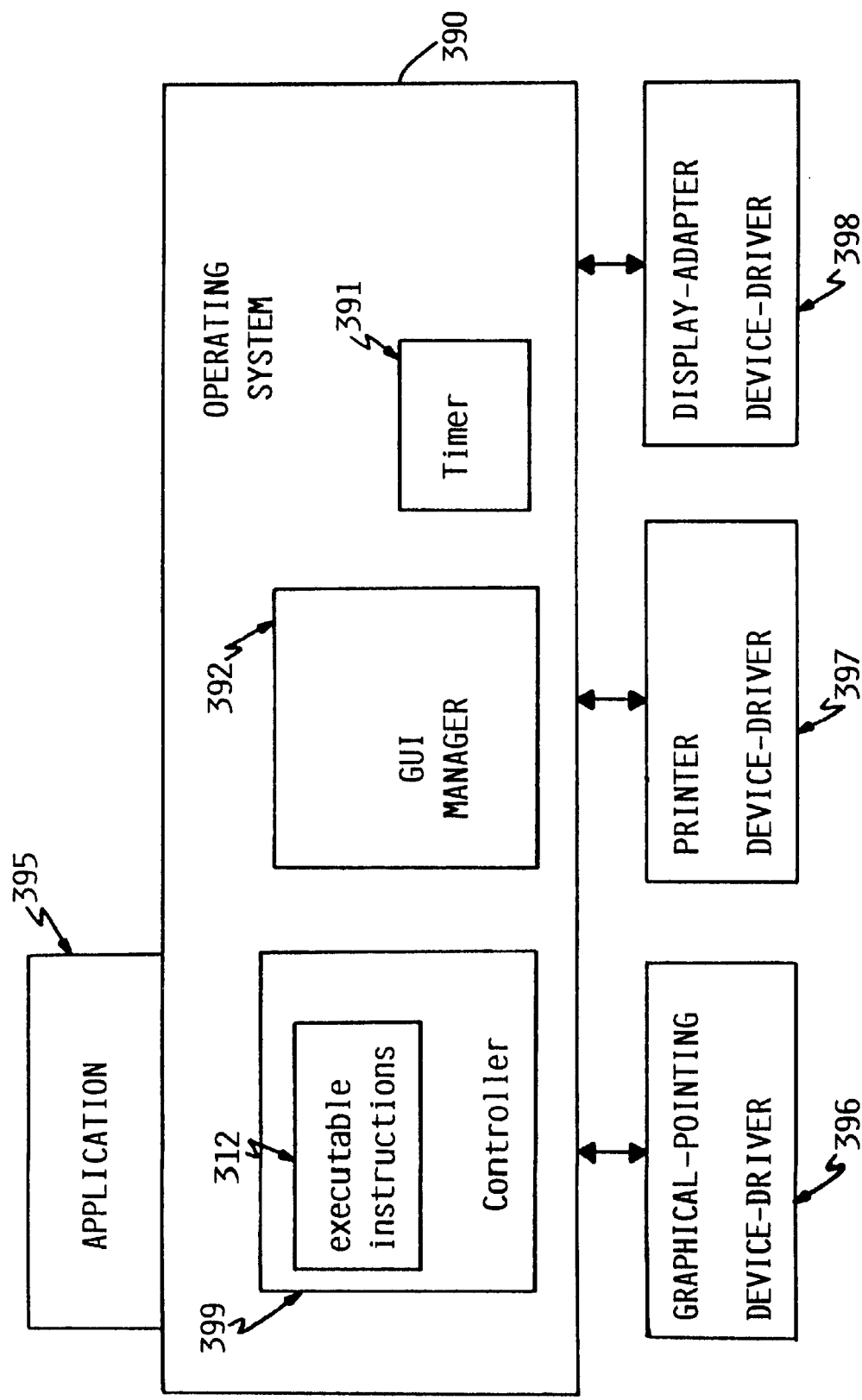
FIG. 3 is a block diagram of software stored within the memory of the computer system depicted in FIG. 1.

With reference now to FIG. 3, there is illustrated a block-diagram representation of the software configuration of computer system 110. As noted above, the software executed by computer system 110 can be stored within one or more of RAM 258, the nonvolatile storage provided by diskette drive 122, hard-disk drive 123, CD-ROM drive 124, or a remote server accessible via modem 287 or network adapter 285.

As illustrated, the software configuration of computer system 110 includes operating system 390, which is responsible for directing the operation of computer system 110. For example, operating systems typically include computer software for controlling the allocation and usage of hardware resources such as memory, CPU time, disk space, and peripheral devices. Other technologies also could be utilized, such as touch-screen technology or human-voice control. The operating system is the foundation upon which applications 395, such word-processing, spreadsheet, and web-browser programs are built.

In accordance with the preferred embodiment, operating system 390 includes graphical-user-interface (GUI) 392 manager although they could be packaged separately. GUI 392 manages the graphical user-interface with which a user of computer system 110 interacts.

Operating system 390 also includes controller 399. Controller 399 contains executable instructions 312. Although controller 399 is drawn as being included in operating system 390, they could be packaged separately.

Operating system 390 also includes timer 391, which uses the clock (not shown) of CPU 226 to measure time. Timer 391 is capable of interrupting software after expiration of a specified time. In an alternative embodiment, timer 391 could be a hardware register, such as a clock register or a time register. Setting such a register would place a value in the register, and the register would decrement the value with each instruction or processor cycle. An interrupt then occurs when the register value reaches zero, which interrupts software instructions executing on CPU 226 after expiration of the specified time.

Referring again to FIG. 3, CPU 226 is suitably programmed to carry out the preferred embodiment by executable instructions 312, as described in more detail in the flowcharts of FIGS. 8–17. In the alternative, the functions of FIGS. 8–17 could be implemented by control circuitry through the use of logic gates, programmable-logic devices, or other hardware components in lieu of a processor-based system.

Operating system 390 communicates with applications 395 through messages conforming to the syntax of the application-program interface (API) supported by operating system 390. Operating system 390 further communicates with graphical-pointing device-driver 396, printer device-driver 397, and display-adapter device-driver 398. For example, operating system 390 sends graphics data to display-adapter device-driver 398, which in turn translates the messages into bus signals utilized to control display adapter 270. In addition, graphical-pointing device-driver 396 translates signals from pointing device 118 through keyboard/pointing-device controller 284 into Cartesian coordinates and a selection status, which are then relayed to GUI manager 392. Also, operating system 390 sends printer control codes and data to printer device-driver 397, which in turn translates the control codes and data into bus signals used to control printer 120.

FIGS. 4a, 4b, 4c, 4d, 4e, 4f, 5a, 5b, 5c, 6a, 6b, and 6c illustrate pictorial representations of the operation of the preferred embodiment. When reading the descriptions for these figures, it may be helpful to consider the following groups of figures.

Figure 4A:
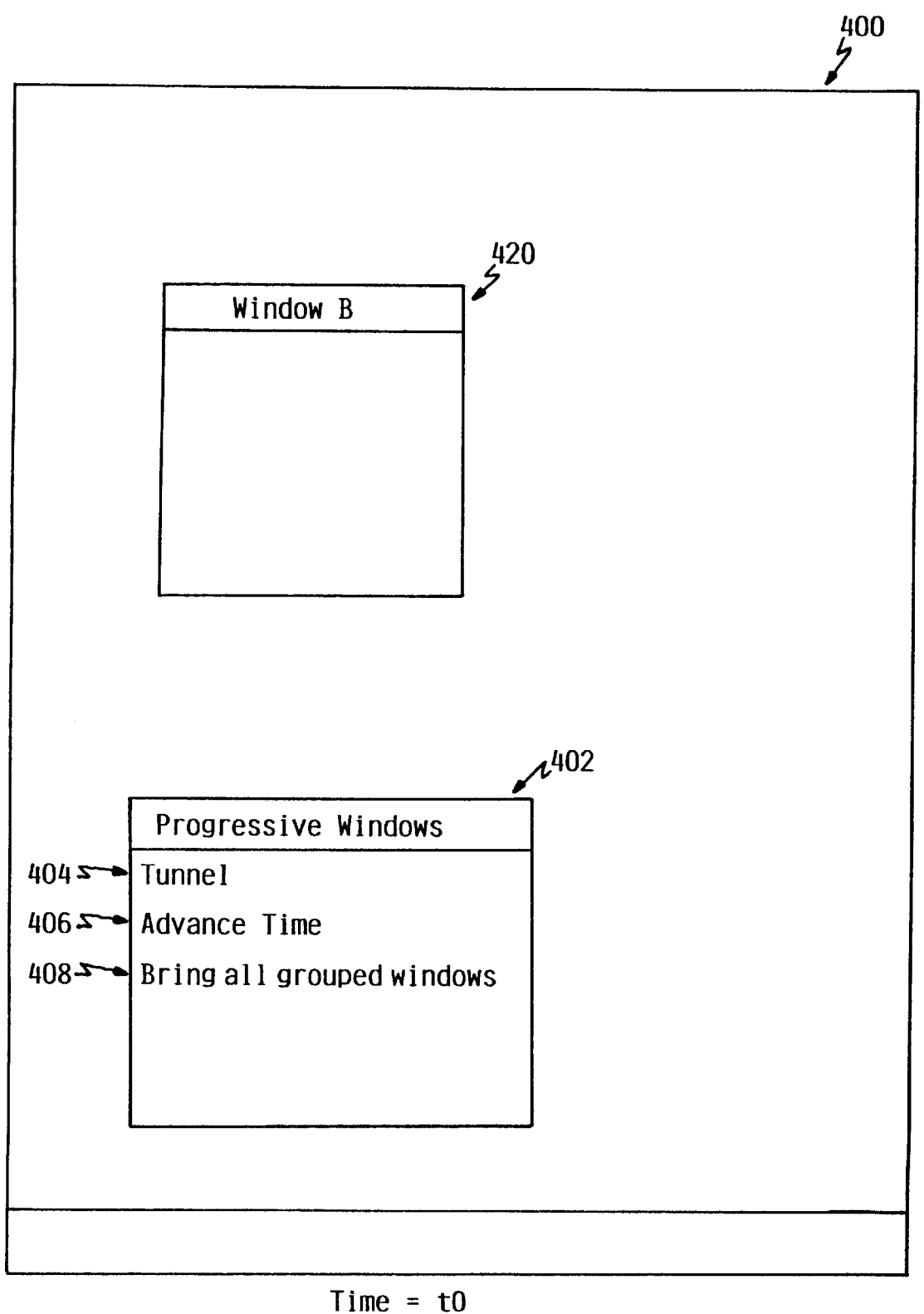
FIGS. 4a, 4b, 4c, 4d, 4e, 4f, 5a, 5b, 5c, 6a, 6b, 6c, and 7 are pictorial representations of the operation of the preferred embodiment.
Figure 4B:
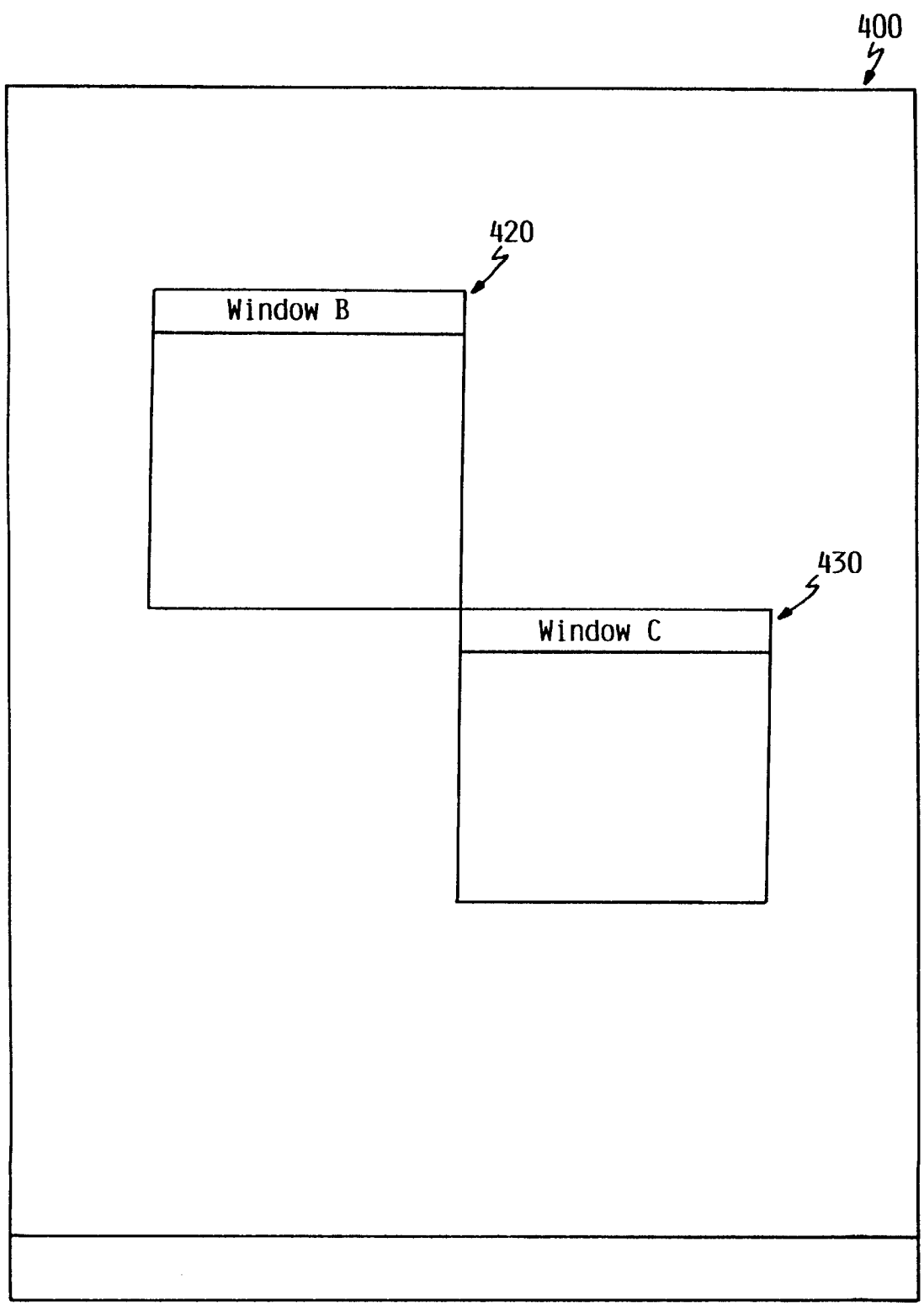
Figure 4C:
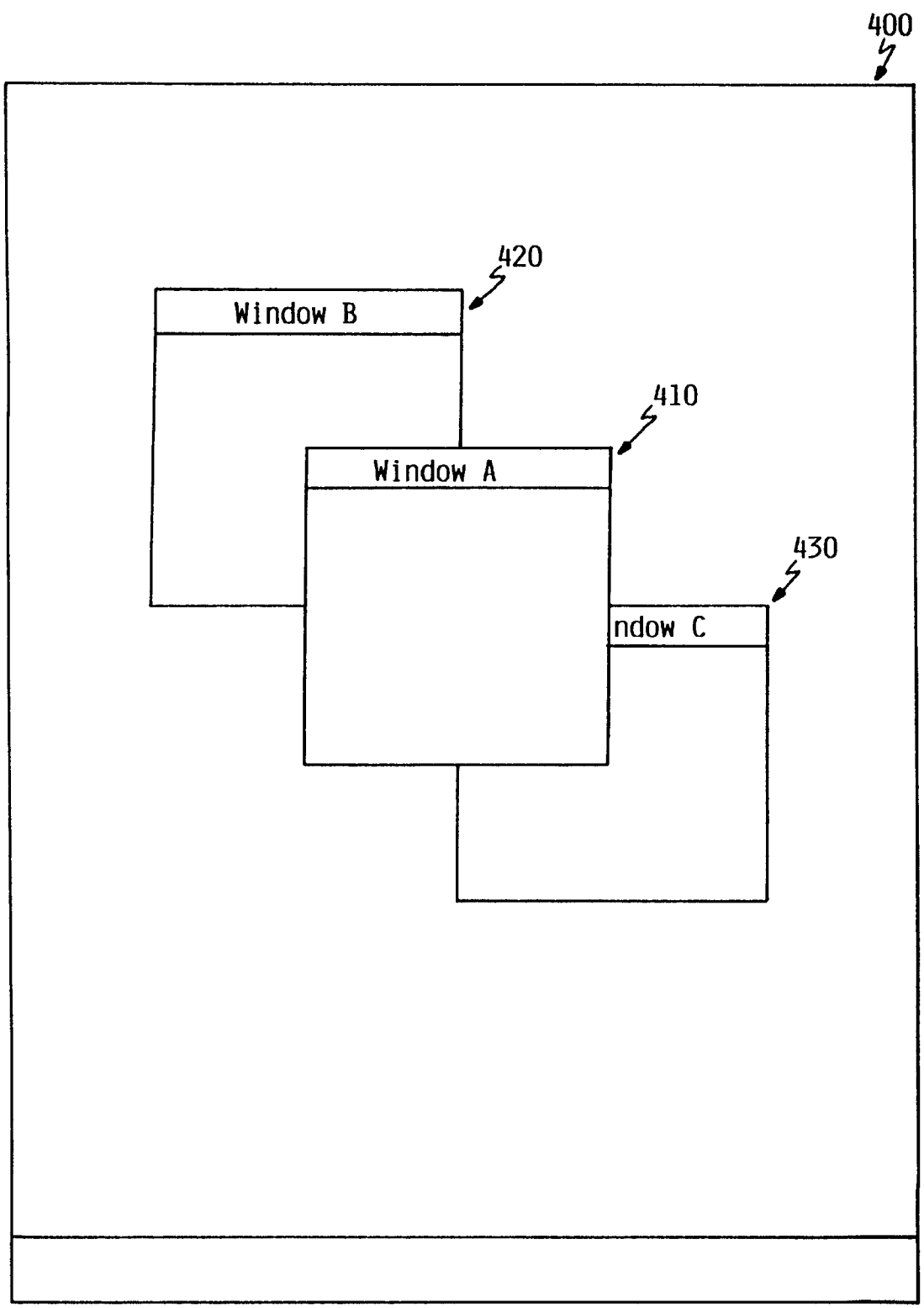

FIGS. 4a, 4b, and 4c show various windows being created and brought into focus. Ordinarily, a window becomes in focus at the time it is created, and at any future time that the user selects it in order to request an operation or input data. A window usually stays in focus until some other window is selected. A window being in focus means that it is in the foreground of the desktop with no overlying windows and it is ready to accept user input. An example of being ready to accept user input is when the window has an active cursor displayed within the window.

Figure 4D:
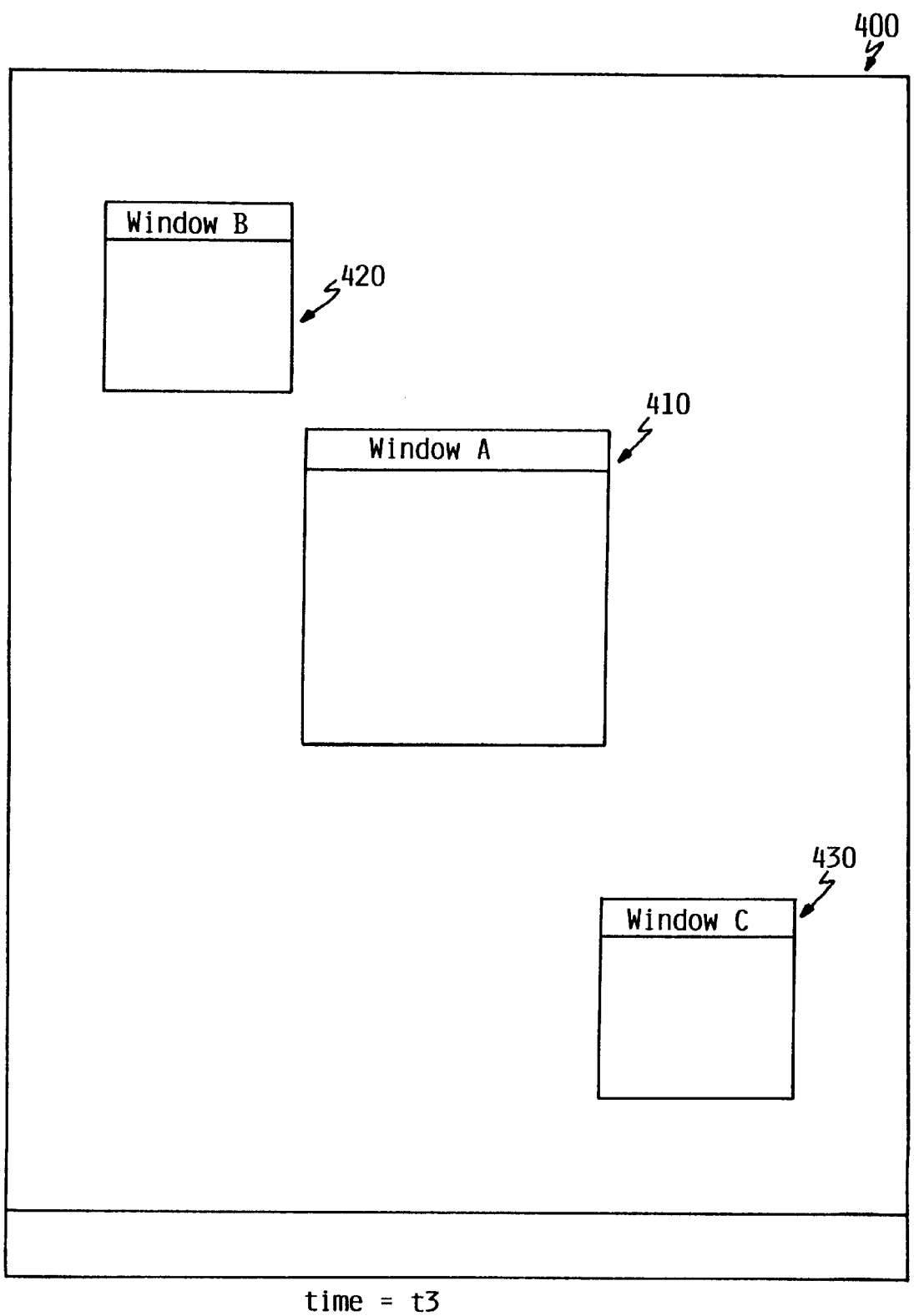
Figure 4E:
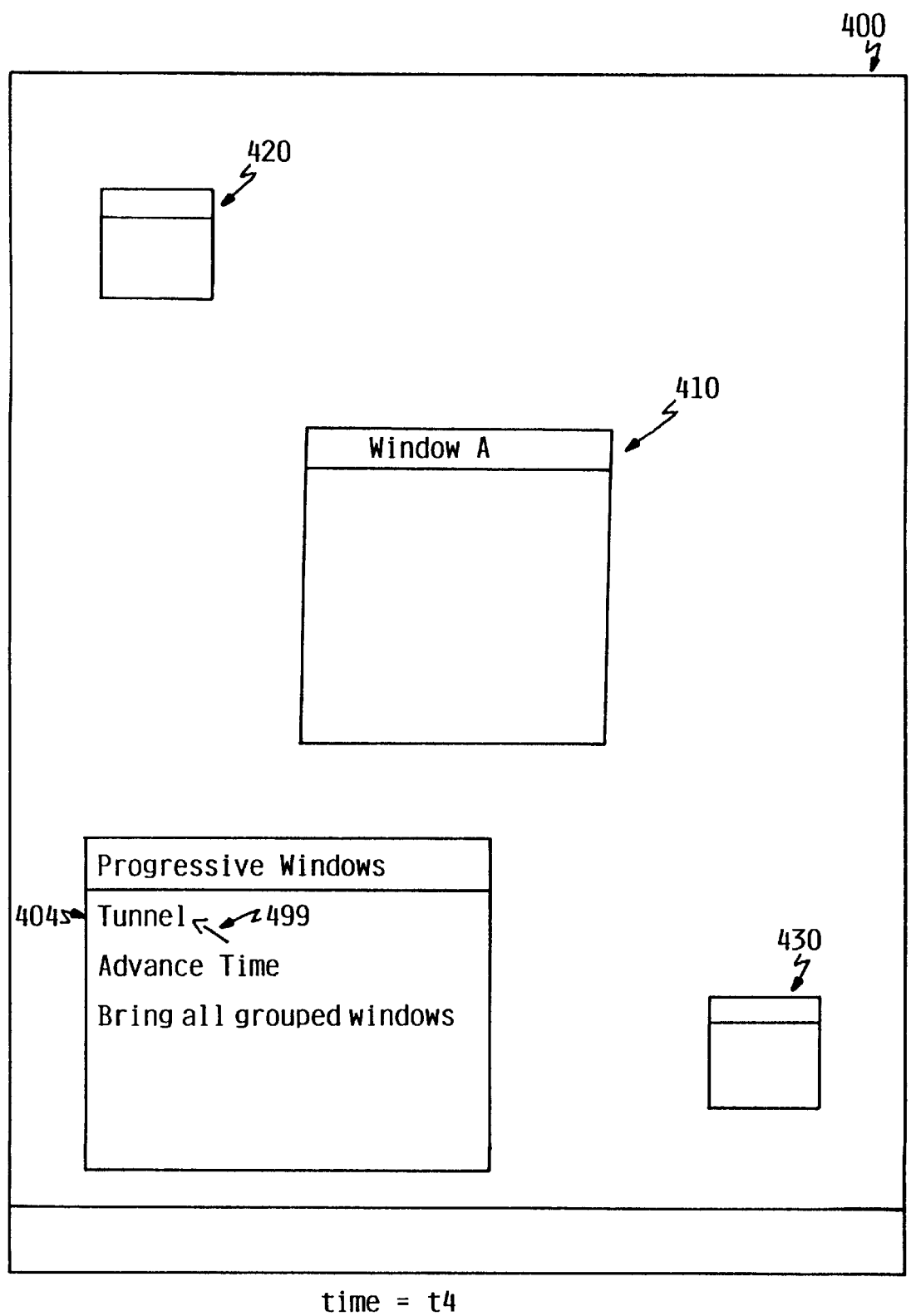
Figure 4F:
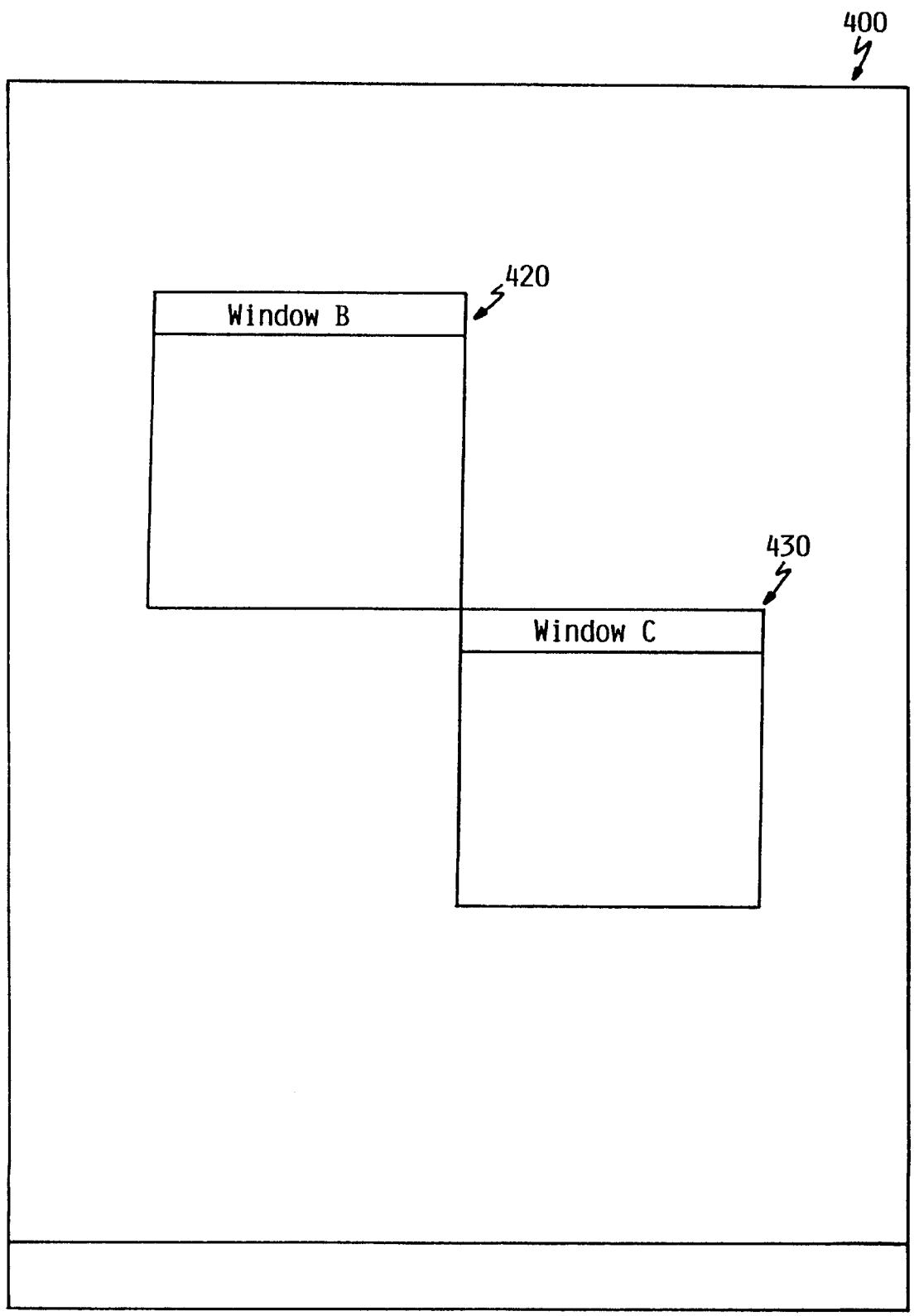

FIGS. 4d and 4e show the windows created in FIGS. 4a–4c as they progress through time. FIG. 4f shows the desktop after the user has requested a tunneling event at FIG. 4e.

Figure 5A:
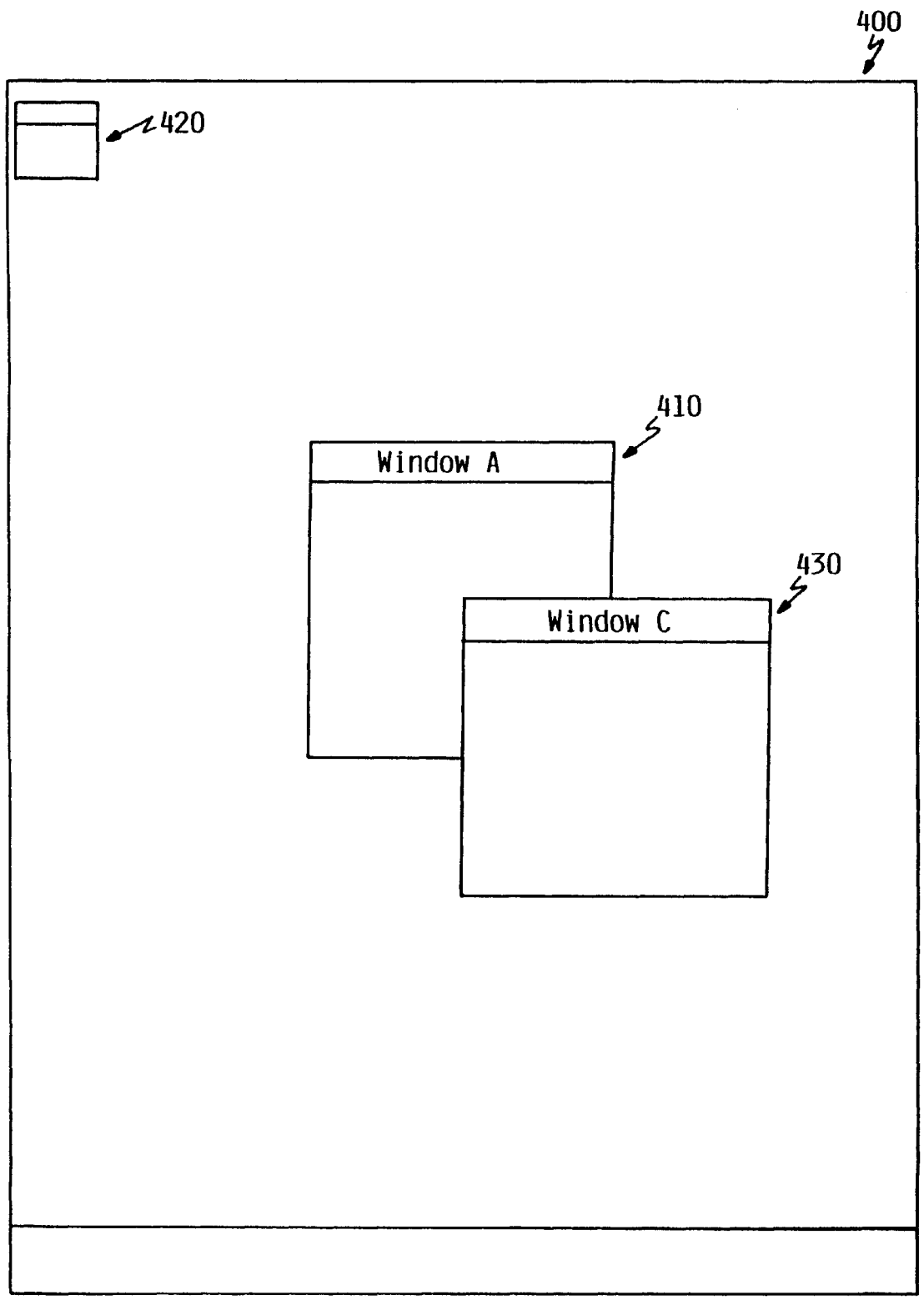
Figure 5B:
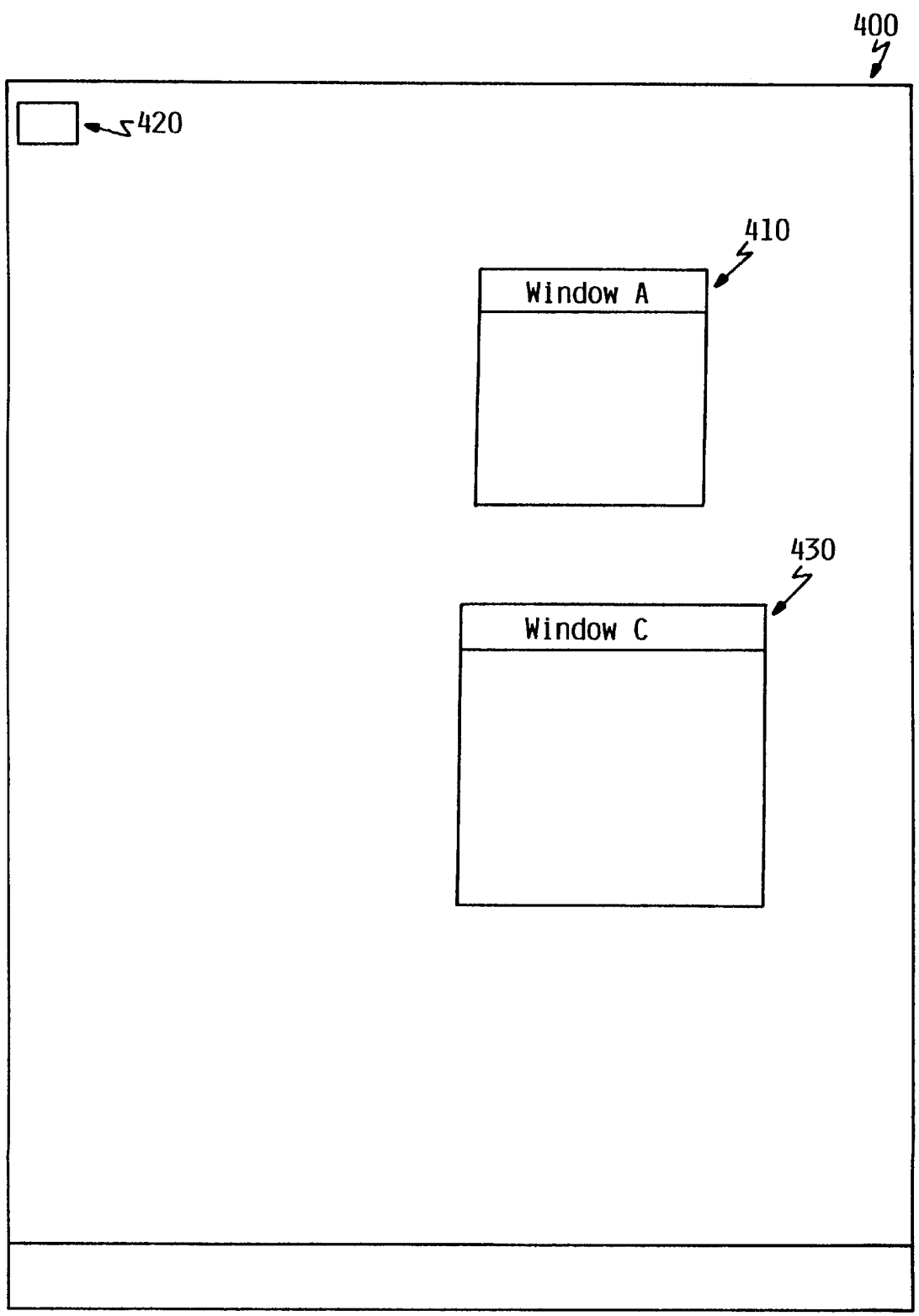
Figure 5C:
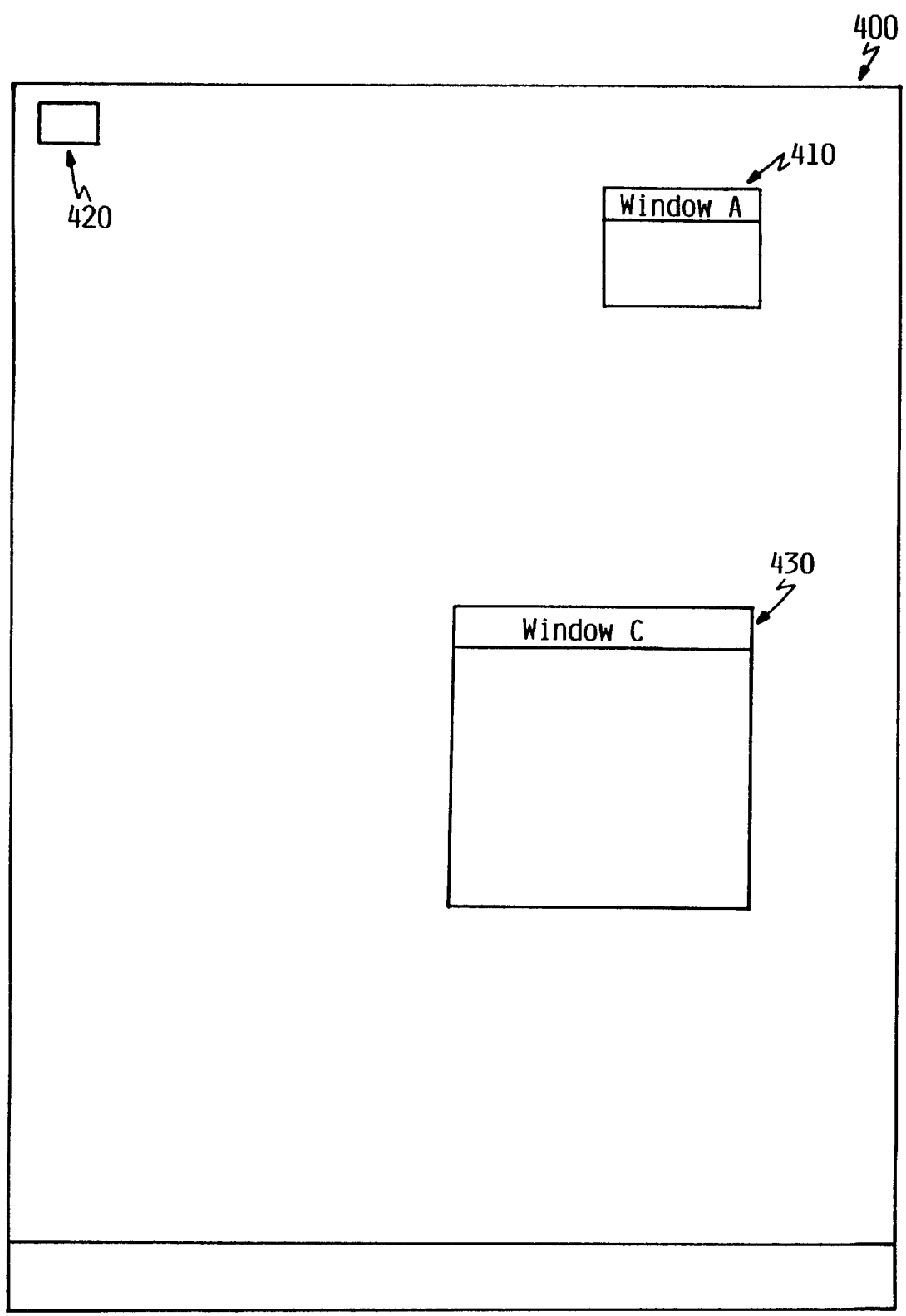

FIGS. 5a–5c show the desktop after the user has requested a get-focus event at FIG. 4f.

Figure 6A:
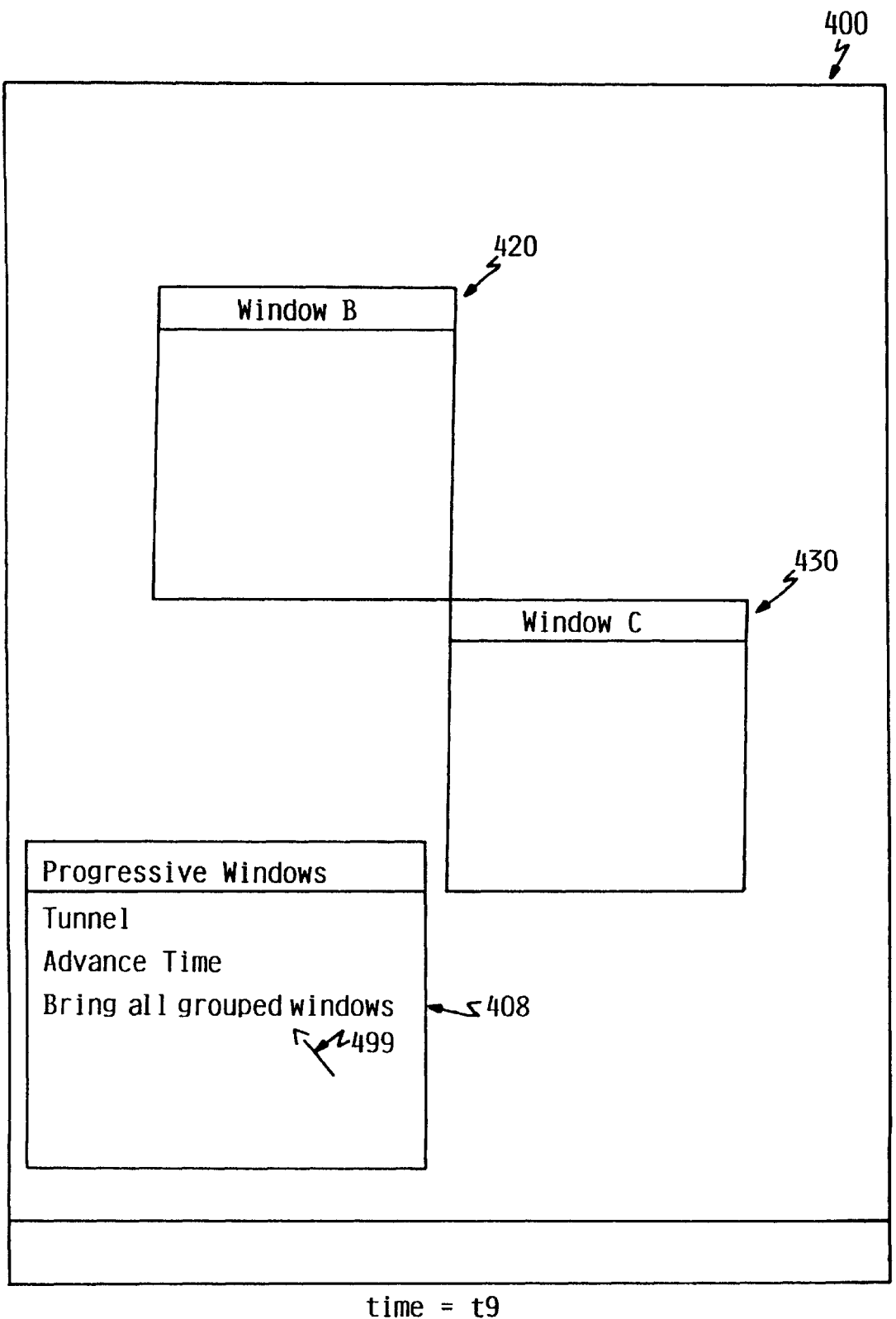
Figure 6B:
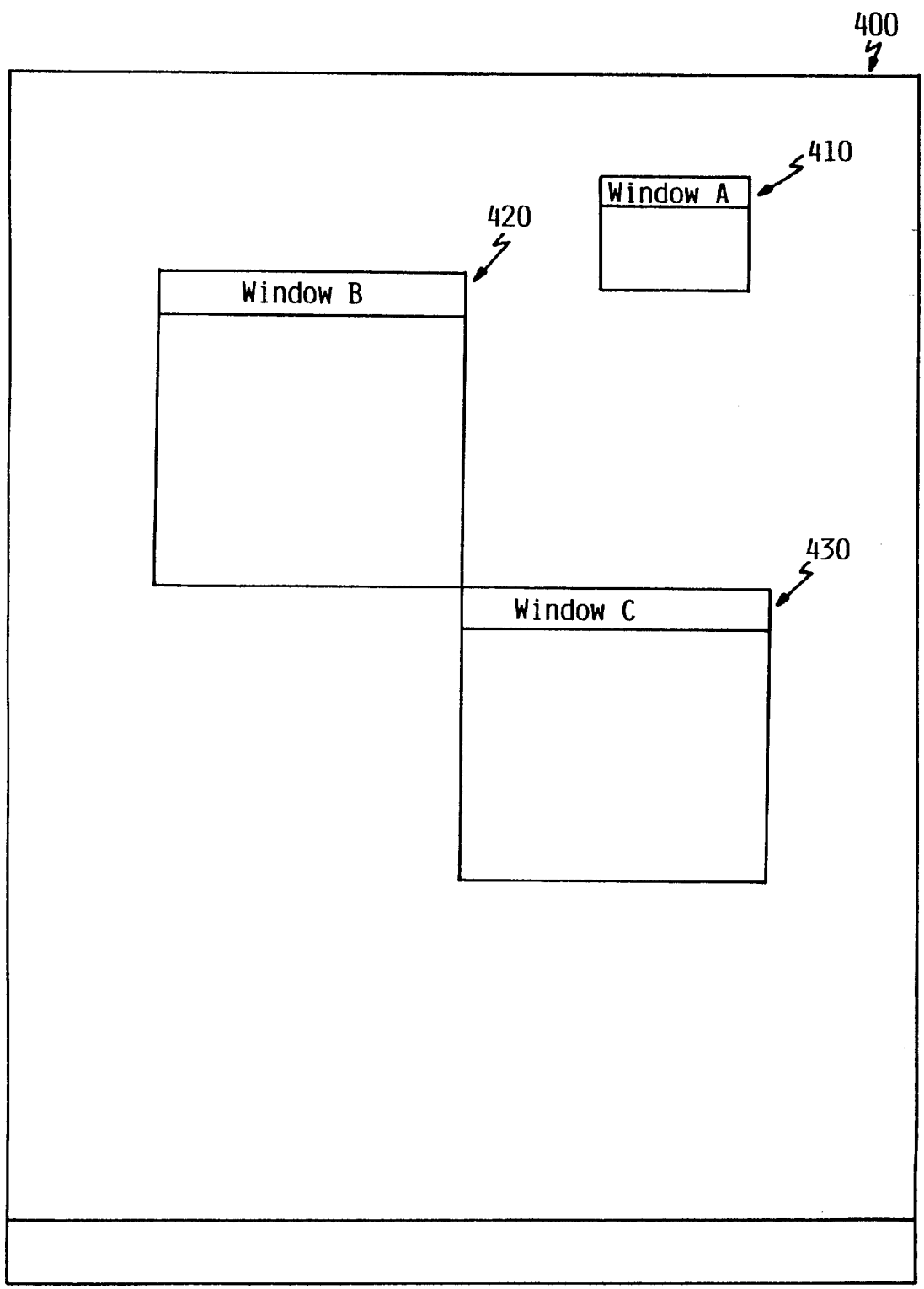
Figure 6C:
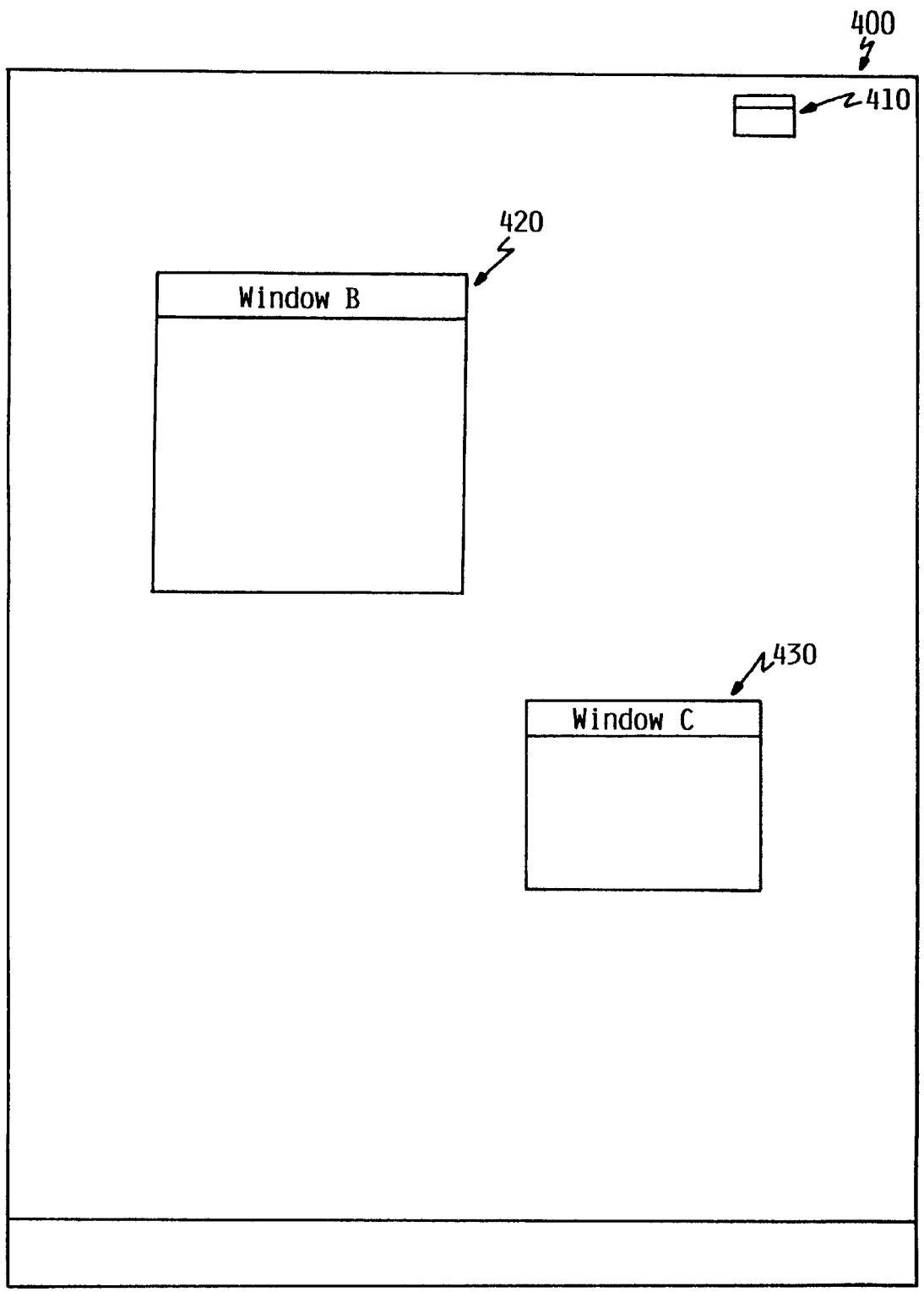

FIGS. 6a–6c show the desktop after the user has requested a bring-all-grouped-windows event.

Referring to FIG. 4a, there is shown desktop 400 displayed on display 114 at time=t0, which is the original time.

In response to the user requesting that a window be created, controller 399 has created and displayed window 420 on desktop 400. Window 420 is in focus, which means that it is in the foreground of desktop 400 with no overlying windows and it is ready to accept user input. An example of being ready to accept user input is when the window has an active cursor displayed within the window. Also displayed on desktop 400 is progressive-windows environment 402, which contains tunnel option 404, advance-time option 406, and bring-all-grouped-windows option 408. When the user selects tunnel option 404 (an example of which is shown in FIG. 4*e*), controller 399 will process a tunnel event, as illustrated below under FIG. 4*f* and described under FIG. 10. Referring again to FIG. 4*a*, when the user selects advance-time option 406, controller 399 will process an advance-time event, as described below under the description for FIG. 10. Referring again to FIG. 4*a*, when the user selects bring-all-grouped-windows option 408, controller 399 will process a bring-all-grouped-windows event, as illustrated below at FIG. 6*a* and described at FIG. 10.

Referring to FIG. 4*b*, there is shown desktop 400 displayed on display 114 at time=t1, which is after time=t0. In response to the user requesting that a window be created, controller 399 has created and displayed window 430 in addition to window 420. Window 430 is in focus.

Referring to FIG. 4*c*, there is shown desktop 400 displayed on display 114 at time=t2, which is after time=t1. Time advanced from t1 to t2 as a result of the processing described below under the description for either FIG. 9 or FIG. 16. In response to the user requesting that a window be created, controller 399 has created and displayed window 410 in addition to windows 420 and 430. Window 410 is in focus.

Referring to FIG. 4*d*, there is shown desktop 400 displayed on display 114 at time=t3, which is after time=t2. Time advanced from t2 to t3 as a result of the processing described below under the description for either FIG. 9 or FIG. 16. Since the user is working in window 410, it is in focus. Windows 420 and 430 have become smaller than they were at time=t2 and have moved toward the border. Thus, as long as window 410 remains in focus, it will hold its size and position while windows 420 and 430 will recede into the background as time progresses. "Recede into the background" means that the windows get smaller and move toward the desktop boundary.

Referring to FIG. 4*e*, there is shown desktop 400 displayed on display 114 at time=t4, which is after time=t3. Time advanced from t3 to t4 as a result of the processing described below under the description for either FIG. 9 or FIG. 16. Windows 420 and 430 are even smaller and disposed more toward the border than they were at time=t3. Since the user is working in window 410, it remains in focus and at the same position and size as it was at time=t3 and t2. At time=t4, the user has decided to initiate a tunnel event, so the user has selected window 430 and positioned pointing-device pointer 499 on tunnel option 404 and is about to select it. (The selection of window 430, in this case, does not bring it into focus.) The user is taking these actions because the user would like the desktop to be restored to the condition it was in at the time when window 430 was last in focus. The result of the user selecting tunnel option 404 and the processing performed by controller 399 in response to the tunnel event is shown in FIG. 4*f* and described under the description for FIG. 10.

Referring to FIG. 4*f*, there is shown desktop 400 displayed on display 114 at time=t5, which is after time=t4. Controller 399 has displayed window 420 and window 430 on desktop 400 in response to the user selecting window 430 and tunnel option 404 at time=t4, as shown in FIG. 4*e*. Referring again to FIG. 4*f*, controller 399 has restored the windows on desktop 400 to the same position and size as at time=t1 because that was the time that window 430 (the user-selected window) was last in focus, as further described below under the description for FIG. 11. Referring again to FIG. 4*f*, controller 399 did not display window 410 because it did not yet exist at time=t1. (In the general case, windows that have a last-time-in-focus that is more recent than the last-time-in-focus of the selected window are not displayed.) At time=t5, none of the windows are in focus. Referring to FIG. 5*a*, there is shown desktop 400 displayed on display 114 at time=t6, which is after time=t5. When the desktop appeared as in FIG. 4*f*, the user selected window 430, which caused a get-focus event, which causes controller 399 to display the desktop as in FIG. 5*a*. The processing of controller 399 in response to the get-focus event is further described below under the description for FIGS. 10 and 15. Referring again to FIG. 5*a*, when a get-focus event occurs, controller 399 draws the selected window at its actual (original) size and position. The actual (original) size and position of a window is its size and position at the last time that the user explicitly modified it. Since the user selected window 430 for the get-focus event, controller drew window 430 at its time=t1 size and position, which is the actual (original) size and position of window 430.

To determine the position of window 420, controller 399 uses the difference between the current time (t6) and the most recent time that window 420 was in focus (t0) to calculate the current size and position for window 420. Thus, in FIG. 5*a*, window 420 is slightly smaller and more toward the border than it was at time=t4 (the time that the tunnel event was initiated). See the description for FIGS. 15, 12, and 14 for more information about the processing of controller 399 in drawing window 420.

Referring again to FIG. 5*a*, to determine the position of window 410, controller 399 uses the difference between the current time (t6) and the last time that window 410 was last in focus (t4) to calculate the current size and position for window 410. Thus, in FIG. 5*a*, window 410 is slightly smaller and more toward the border than it was at time=t4 (the time that the tunnel event was initiated). See the description for FIGS. 15, 12, and 14 for more information about the processing of controller 399 in drawing window 410.

Referring to FIG. 5*b*, there is shown desktop 400 displayed on display 114 at time=t7, which is after time=t6. Time advanced from t6 to t7 as a result of the processing described below under the description for either FIG. 9 or FIG. 16. Window 430 has remained in focus while window 410 has become smaller than it was at time=t6 and have moved toward the border. Window 420 has become minimized as an icon.

Referring to FIG. 5*c*, there is shown desktop 400 displayed on display 114 at time=t8, which is after time=t7. Time advanced from t7 to t8 as a result of the processing described below under the description for either FIG. 9 or FIG. 16. Window 410 is even smaller and disposed more toward the border than it was at time=t7 while window 430 has remained at the same size and position as it was at time=t6 because it has remained in focus. Window 420 remains minimized as an icon. Thus, as is illustrated in FIGS. 4*a*, 4*b*, 4*c*, 4*d*, 4*e*, 4*f*, 5*a*, 5*b*, and 5*c* controller 399 keeps toward the foreground those windows that the user is accessing more frequently (i.e., these windows stay near their actual size and position). In contrast, controller 399 migrates toward the background those windows that the user is accessing less frequently (i.e., these windows become smaller and disposed toward the border). Controller 399 migrates a windows at a rate proportional to the time elapsed since the window was most recently in focus, as further described below under the description for FIG. 14.

Referring to FIG. 6a, there is shown desktop 400 displayed on display 114 at time=t9, which is after time=t5. When the desktop appeared as at t5 (FIG. 4f), the user selected window 420 (without bringing it into focus) and positioned pointing-device pointer 499 on bring-all-grouped-windows 408. The result of the user selecting bring-all-grouped-windows 408 is shown in FIG. 6b.

Referring to FIG. 6b, there is shown desktop 400 displayed on display 114 at time=t10, which is after time. Since the user selected window 420, window 430 is closest in time to 420, so controller 399 puts windows 420 and 430 in a group. Controller 399 also sets the last-time-in-focus to be time=10 for both windows 430 and 420 while the last-time-in-focus for window 410 remains time=t4.

For both windows in the group (windows 430 and 420), controller 399 draws the windows as their actual (original) size and position because the last-time-in-focus equals the current time, and the size of the window is calculated based on how far the last-time-in-focus is from the current time. The actual size and position of window 420 is its size and position at time=t0 (FIG. 4a), which is when it was created. The actual (original) size and position of window 430 is its size and position at time=t1 (FIG. 4b), which is when it was created.

For the window outside of the group (window 410), controller 399 calculates the size and position based on the difference between the current time (t10) and the last-time-in-focus (t4). Time=10 is three time units away from t4; thus, window 410 is smaller and toward the upper-right corner of the desktop than it was at time=t4.

Referring to FIG. 6c, there is shown desktop 400 displayed on display 114 at time=11, which is after time=t10. Time advanced from t10 to t11 as a result of the processing described below under the description for either FIG. 9 or FIG. 16. Window 420 is in focus, so it has remained in the same position it was at time=t10 while both windows 410 and 430 have become slightly smaller and disposed more toward the border of desktop 400.

Figure 7:
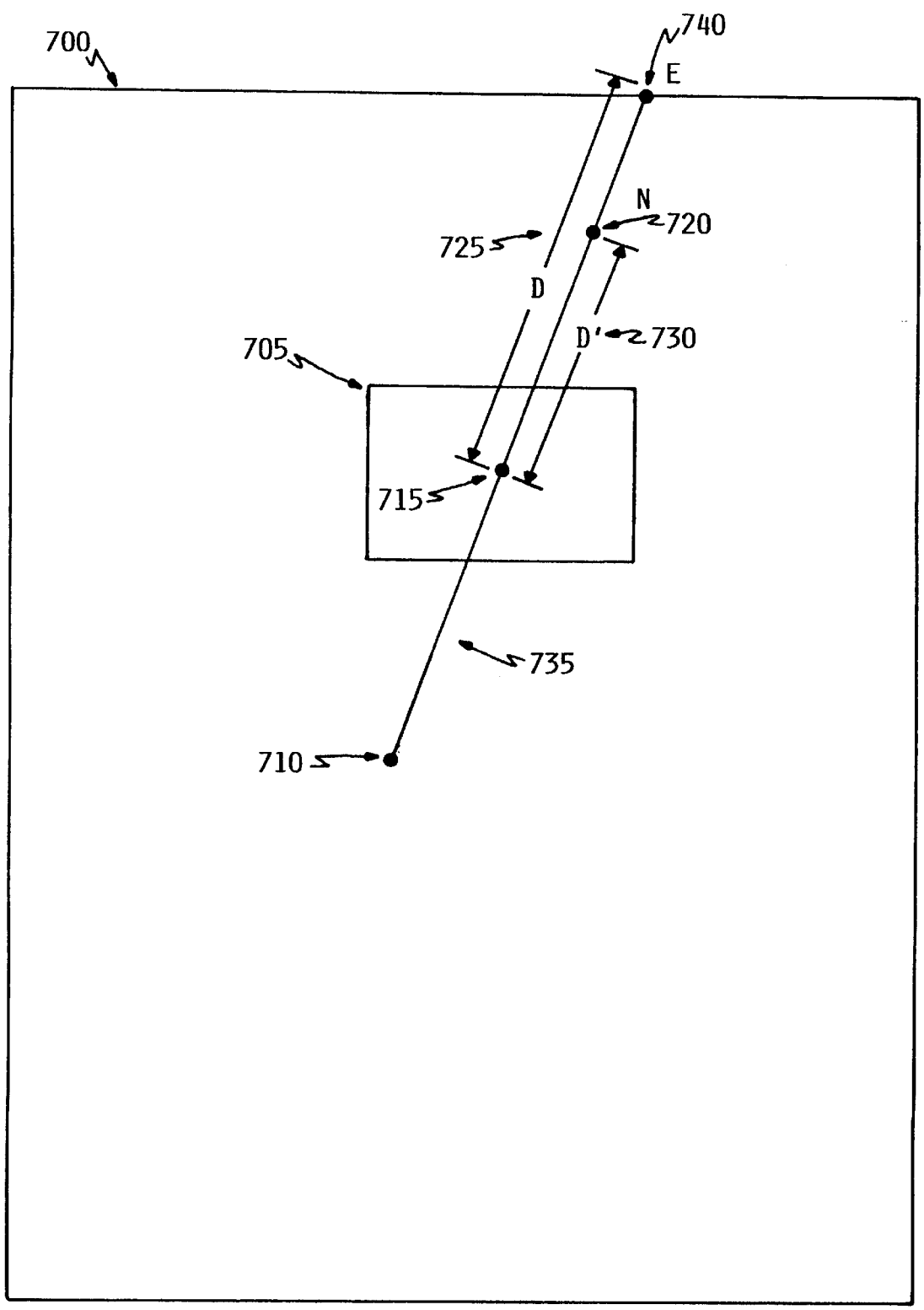
Figure 14A:
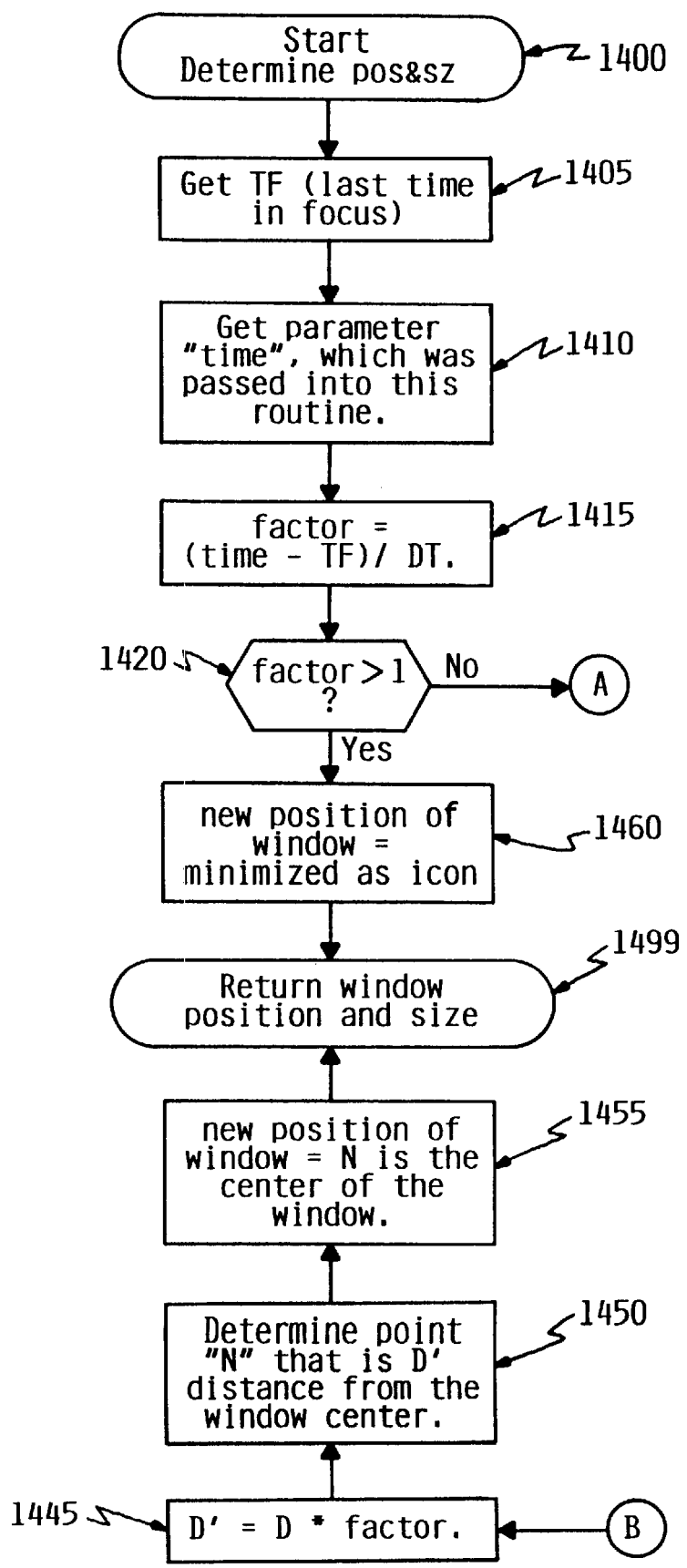
Figure 14B:
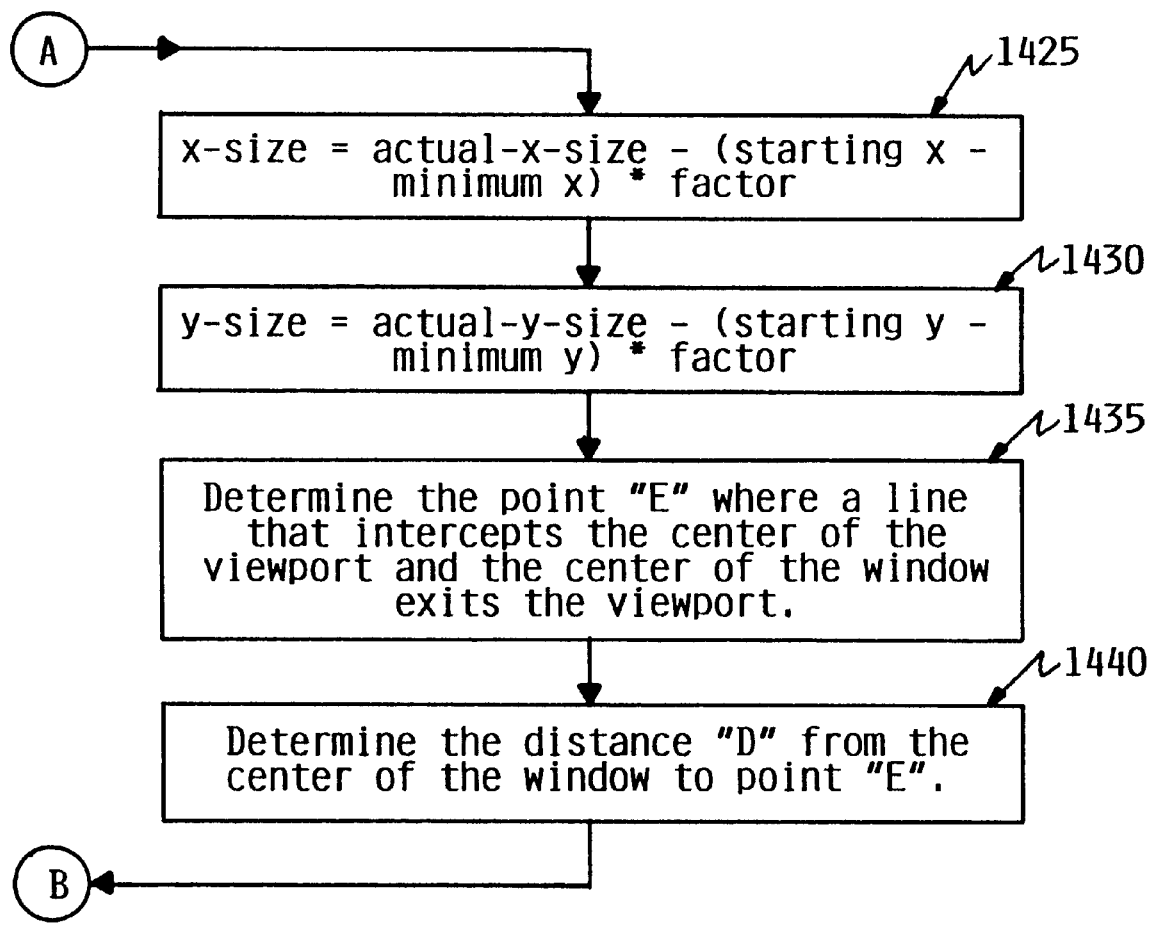

FIG. 7 is a pictorial illustration of an example of the logic of FIG. 14. Desktop center-point 710 is the center of desktop 700. Window 705 is an example of the window being operated on by the logic of FIG. 14. Referring again to FIG. 7, window center-point 715 is the center of window 705. Line 735 is the line that intercepts desktop center-point 710 and window center-point 715. Point 740 is the point where line 735 exits desktop 700. Distance 725 is the distance from window center-point 715 to point 740. Point 720 is the calculated point of the new window. Distance 730 is the distance from window center-point 715 to point 720.

Figure 8:
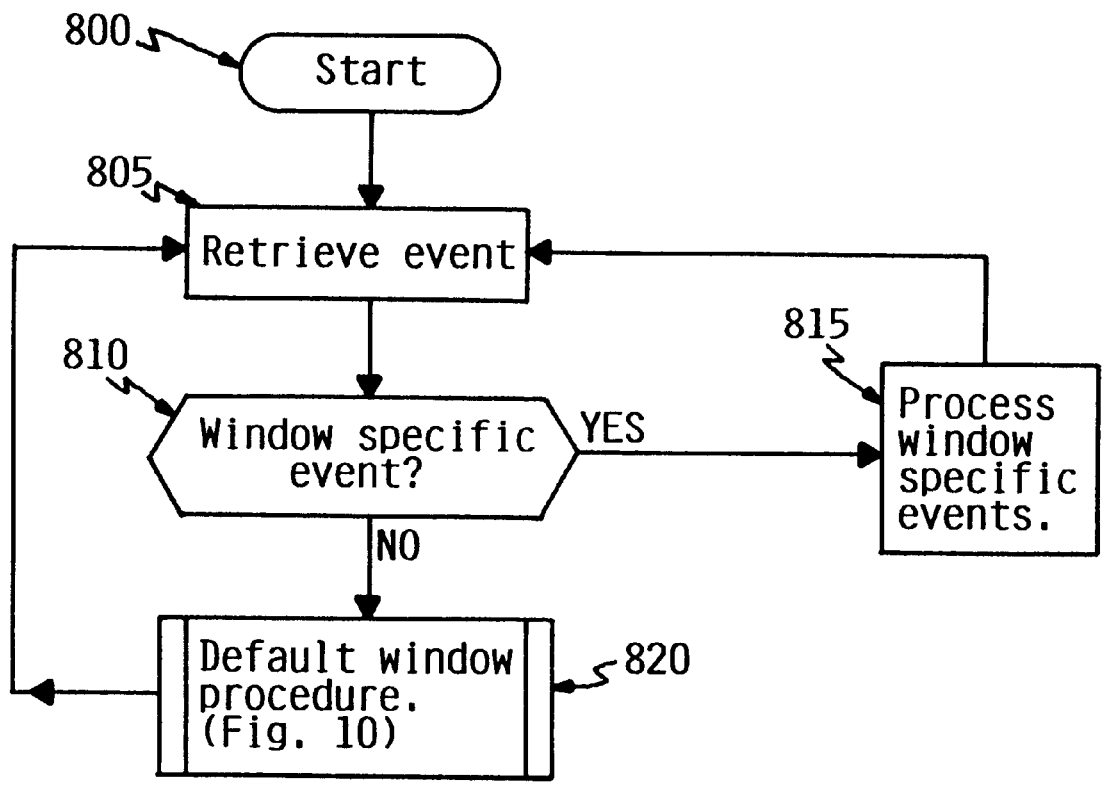
FIGS. 8, 9, 10, 11, 12, 13, 14, 15, 16, and 17 are flowcharts that describe the operation of the preferred embodiment.

FIGS. 8–17 are flowcharts that describe the operation of the preferred embodiment. Referring to FIG. 8, there is illustrated an example of the main logic of controller 399 that processes window events. At block 800, controller 399 starts. Control then continues to block 805 where controller 399 retrieves the received event. Control then continues to block 810 where controller 399 determines whether the retrieved event is an event specific to the window for which it is associated. If the determination at block 810 is true, then control continues to block 815 where controller 399 processes the window-specific event. Control then continues to block 805 as previously described above.

Figure 10A:
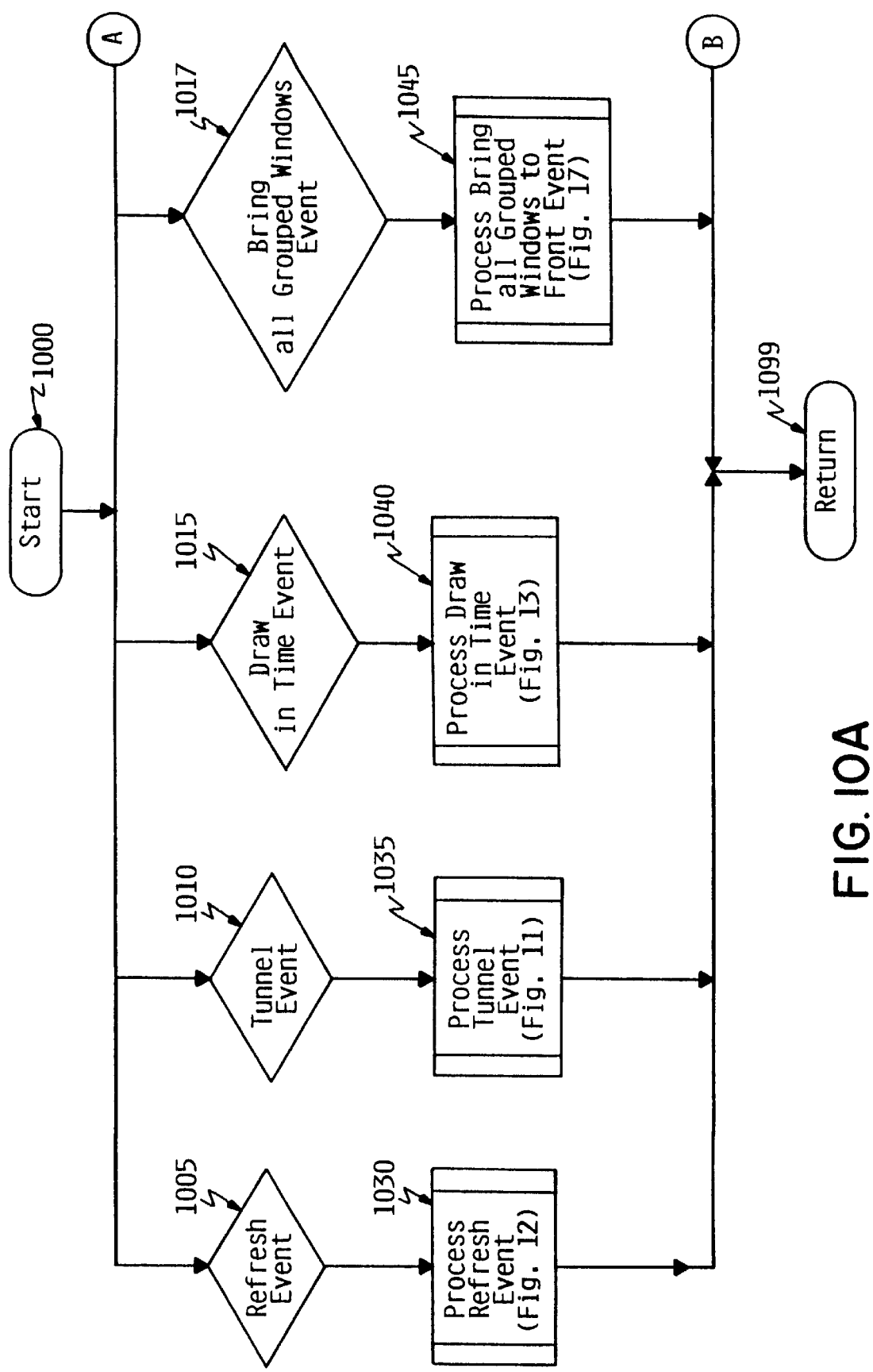
Figure 10B:
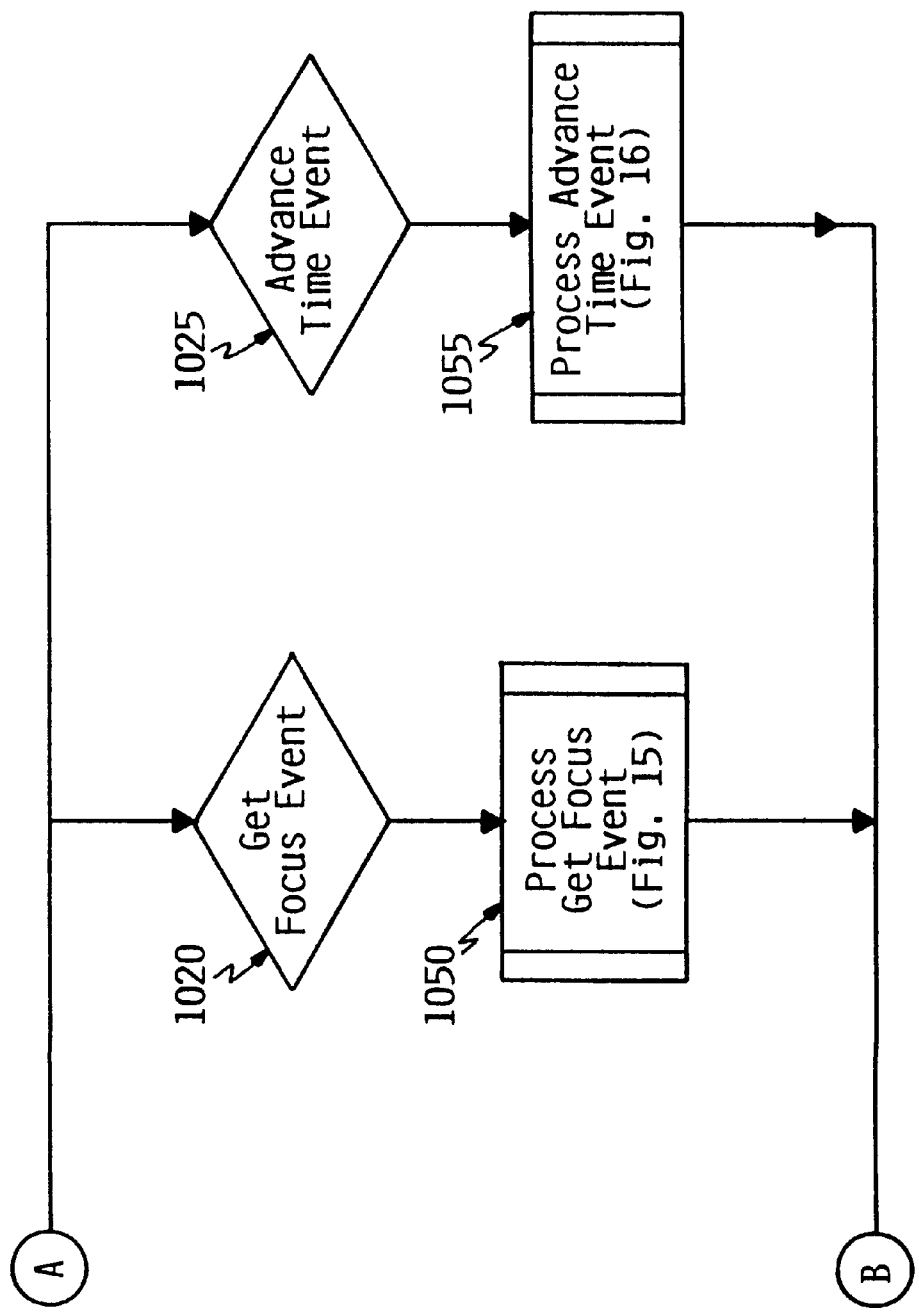

If the determination at block 810 is false, then control continues to block 820 where controller 399 processes the retrieved event, as further described below under the description for FIG. 10. Control then returns to block 805 as previously described above.

Figure 9:
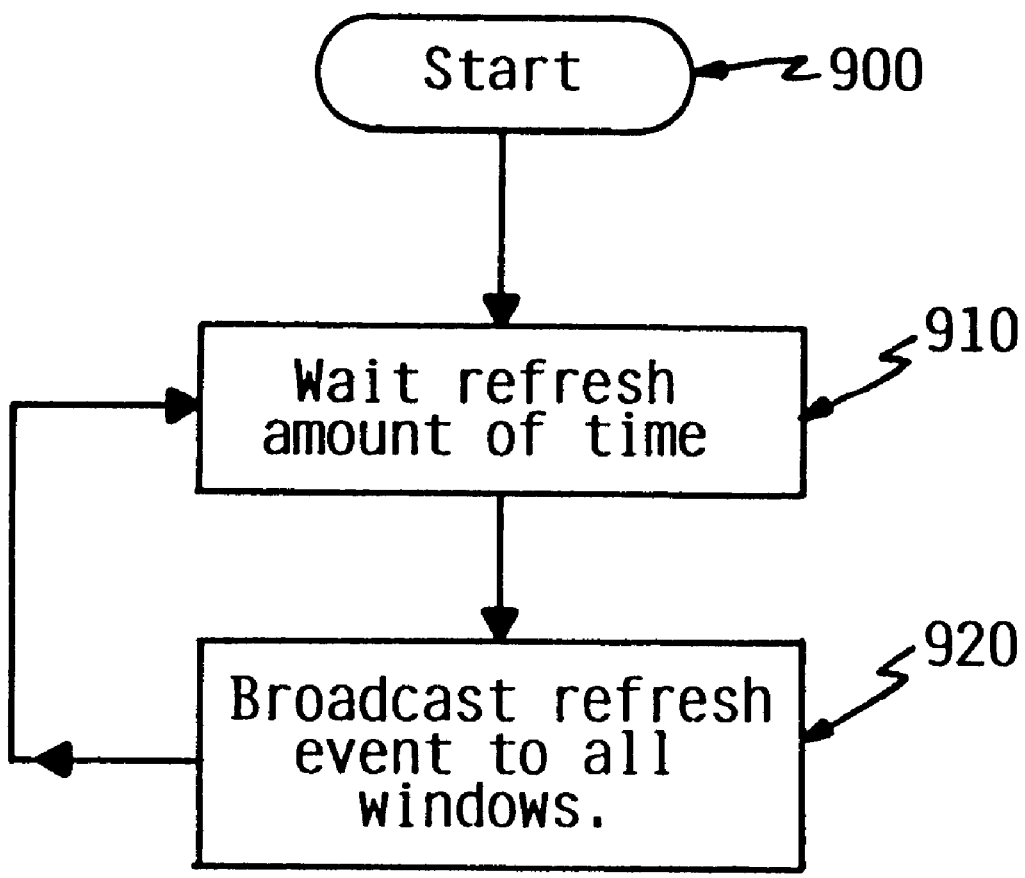

Referring to FIG. 9, there is illustrated a flowchart of sample logic for controller 399 that runs in its own thread and periodically refreshes all displayed windows and thus causes the displayed windows to move and be resized.

At block 900, control begins. Control then continues to block 910 where controller 399 waits for a refresh amount of time, which is a predetermined constant, using timer 391. Upon the expiration of the waiting period, control continues to block 920 where controller 399 broadcasts a "refresh" event to all displayed windows. This "refresh" event will be processed by each respective window, as further described below under the description for FIG. 10. Referring again to FIG. 9, control then returns to block 910, as previously described above.

Referring again to FIG. 10, there is illustrated sample logic for a function within controller 399 that processes default window events. There is an instance of the logic of FIG. 10 that runs for each respective, displayed window. At block 1000, control begins. Control then continues to either of blocks 1005, 1010, 1015, 1017, 1020, or 1025, depending on which event controller 399 received. Controller 399 detects a refresh event at block 1005, a tunnel event at block 1010, a draw-in-time event at block 1015, a bring-all-grouped-windows event at block 1017, a get-focus event at block 1020, and an advance-time event at block 1025.

If the event received was a refresh event, then control continues from block 1005 to block 1030 where controller 399 processes the refresh event, as further described below under the description for FIG. 12. Referring again to FIG. 10, control then continues to block 1099 where the function returns.

If the event received was a tunnel event, then control continues from block 1010 to block 1035 where controller 399 processes the tunnel event, as further described below under the description for FIG. 11. A tunnel event is initiated by the user selecting tunnel option 404. Referring again to FIG. 10, control then continues to block 1099 where the function returns.

If the event received was a draw-in-time event, then control continues from block 1015 to block 1040 where controller 399 processes the draw-in-time event, as further described below under the description for FIG. 13. Referring again to FIG. 10, control then continues to block 1099 where the function returns.

If the event received was a bring-all-grouped-windows event, then control continues from block 1017 to block 1045 where controller 399 processes the bring-all-grouped-windows event, as further described below under the description for FIG. 17. A bring-all-grouped-windows event is initiated by the user selecting bring-group option 408. Referring again to FIG. 10, control then continues to block 1099 where the function returns. If the event received was a get-focus event, then control continues from block 1020 to block 1050 where controller 399 processes the get-focus event, as further described below under the description FIG. 15. Referring again to FIG. 10, control then continues to block 1099 where the function returns.

If the event received was an advance-time event, then control continues from block 1025 to block 1055 where controller 399 processes the advance-time event, as further described below under the description for FIG. 16. An advance-time event is initiated by the user selecting advance-time option 406. Referring again to FIG. 10, control then continues to block 1099 where the function returns.

Figure 11:
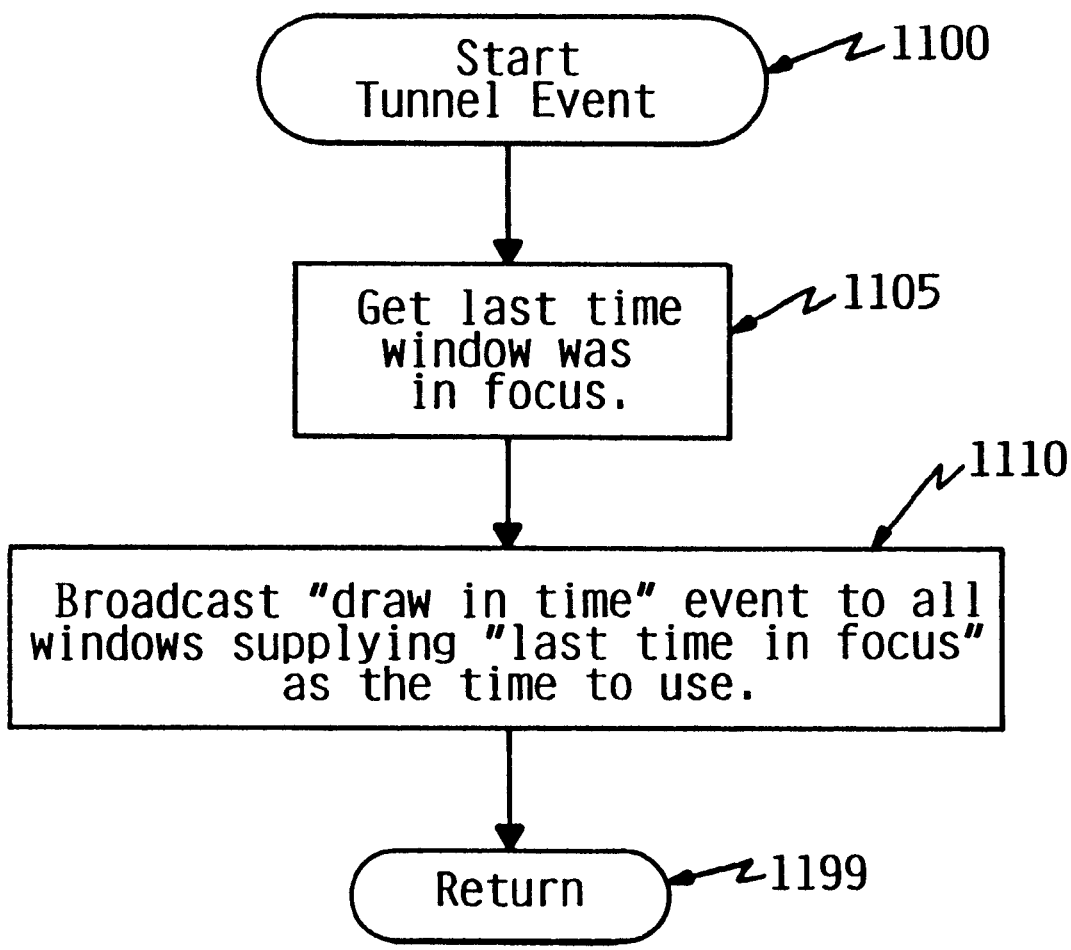

Referring to FIG. 11, there is illustrated sample logic for a portion of controller 399 that processes the tunnel event. At block 1100, control starts. Control then continues to block 1105 where controller 399 retrieves the time that the user-selected window was last in focus, i.e., the most recent time that the selected window was in focus. Control then continues to block 1110 where controller 399 broadcasts a "draw-in-time" event to all windows and includes as a parameter in the "draw-in-time" event the last time in focus that was previously retrieved in block 1105, above. Control then continues to block 1199 where the function returns.

Figure 12:
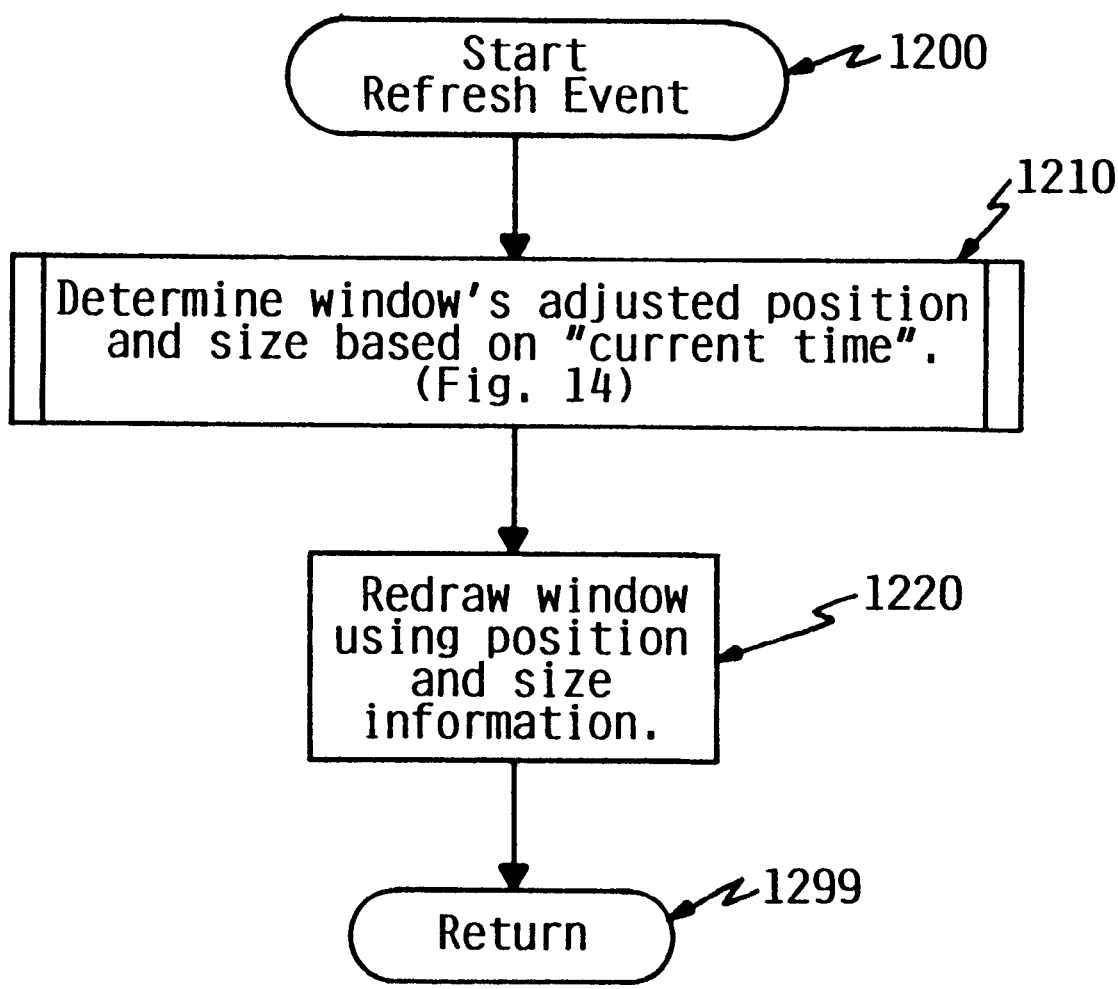

Referring to FIG. 12, there is illustrated sample logic for a portion of controller 399 that processes a refresh event. At block 1200, control starts. Control then continues to block 1210 where controller 399 determines the window's adjusted position and size based on the current time, as further described below under the description for FIG. 14. Control then continues to block 1220 where controller 399 redraws the window using the position and size information that was calculated at block 1210, above. Control then continues to block 1299 where the function returns.

Figure 13:
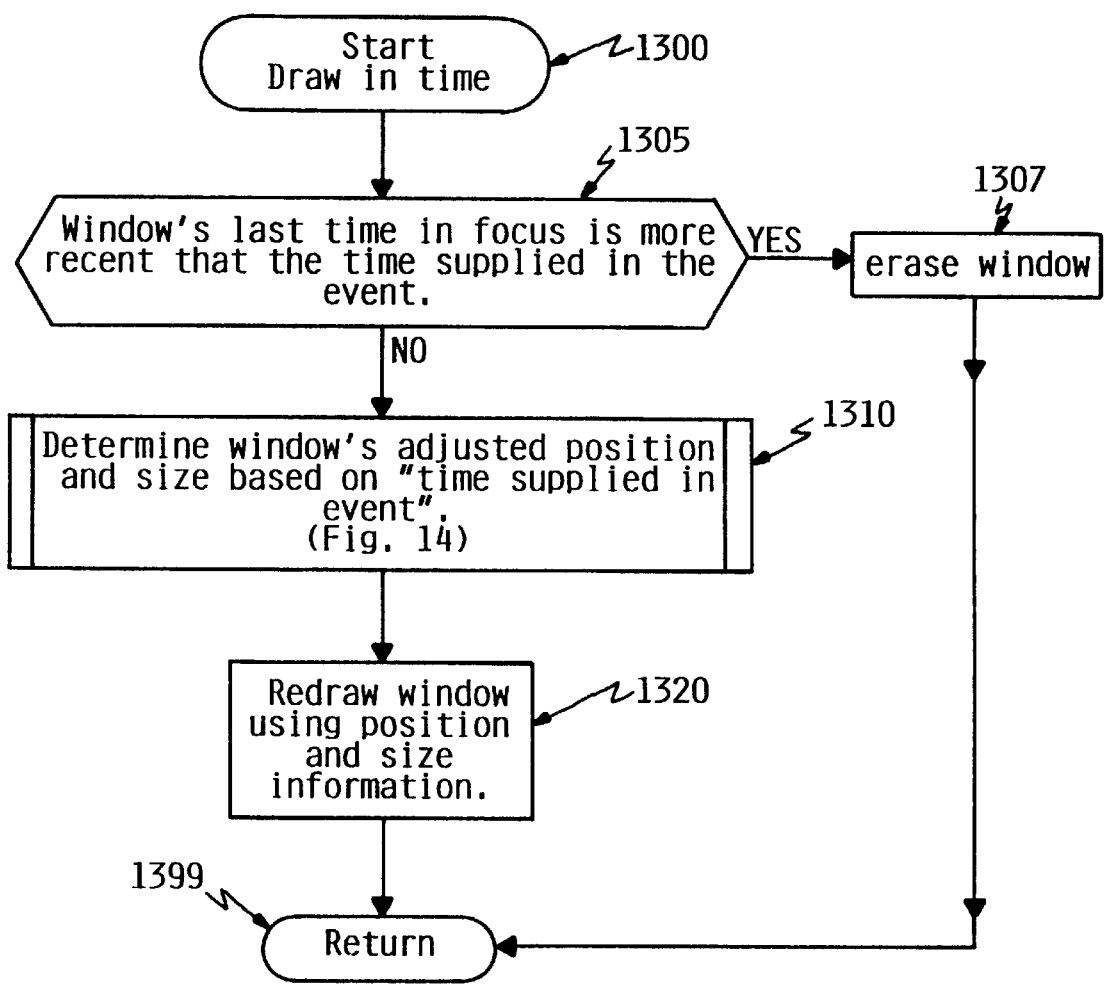

Referring to FIG. 13, there is illustrated sample logic for a portion of controller 399 that processes the draw-in-time event. At block 1300, control starts. Control then continues to block 1305 where controller 399 determines whether the window's last time in focus is more recent than the time supplied in the event. If the determination at block 1305 is true, then control continues to block 1307 where the window is erased from the desktop. Control then continues to block 1307 where the function returns.

If the determination at block 1305 is false, then control continues to block 1310 where controller 399 determines the window's adjusted position and size based on the time that was passed into FIG. 13, as described below under the description for FIG. 14. Referring again to FIG. 13, control then continues to block 1320 where controller 399 redraws the window using the position and size information that was calculated at block 1310. Control then continues to block 1399 where the function returns.

Referring to FIG. 14, there is illustrated sample logic for a portion of controller 399 that determines a new position and size information for the window based on the time parameter that was passed into this routine. At block 1400, control starts. Control then continues to block 1405 where controller 399 determines the last time that this window was in focus and assigns that time to the variable "TF". Control then continues to block 1410 where controller 399 retrieves the "time" parameter that was passed into the logic of FIG. 14. Control then continues to block 1415 where controller 399 sets the factor=(time−TF)/DT. DT is an off-screen threshold, which is a predetermined constant that represents the time that would elapse before the window disappears off the screen.

Control then continues to block 1420 where controller 399 determines whether the calculated factor is greater than 1. If the determination at block 1420 is true, then control continues to block 1460 where controller 399 sets the new position and size to reflect that the window should be minimized as an icon. Control then continues to block 1499 where controller 399 returns the new window position and size.

If the determination at block 1420 is false, then control continues to block 1425 where controller 399 sets x-size= actual-x-size−(starting-x−minimum-x) * factor. Actual-x-size is the window's original x-axis size, meaning the size at the time when the user last explicitly created or modified the window's size. Starting-x is the window's starting size on the x-axis when the user entered the progressive-window mode. Minimum-x is the window's minimum size on the x-axis and is a predetermined constant. Factor was previously calculated in block 1415. Thus, the effect of block 1425 is to shrink the window on the x-axis in proportion to the elapsed time since the window was in focus.

Control then continues to block 1430 where controller 399 sets y-size=actual-y-size−(starting-y−minimum-y) * factor. Actual-y-size is the window's original y-axis size, meaning the size at the time when the user last explicitly created or modified the window's size. Starting-y is the window's starting size on the y-axis when the user entered the progressive-window mode. Minimum-y is the window's minimum size on the y-axis and is a predetermined constant. Factor was previously calculated in block 1415. Thus the effect of block 1430 is to shrink the window on the y-axis in proportion to the elapsed time since the window was in focus.

Control then continues to block 1435 where controller 399 determines the point "E" where a line that intercepts the center of the desktop and the center of the window would exit the desktop. Control then continues to block 1440 where controller 399 determines a distance "D" from the center of the window to point "E". Control then continues to block 1445 where controller 399 calculates D' to be equal to D multiplied by factor. Control then continues to block 1450 where controller 399 determines the point "N" that is D' distance from the actual (original) window center. The actual (original) window center refers to the center of the window at the time that the user last explicitly modified or created the size or position of the window. Control then continues to block 1455 where controller 399 sets the new position of the window to be equal to point "N". Control then continues to block 1499 where controller 399 returns the new window position (previously calculated at block 1455) and the new window size (previously calculated at blocks 1425 and 1430).

Figure 15:
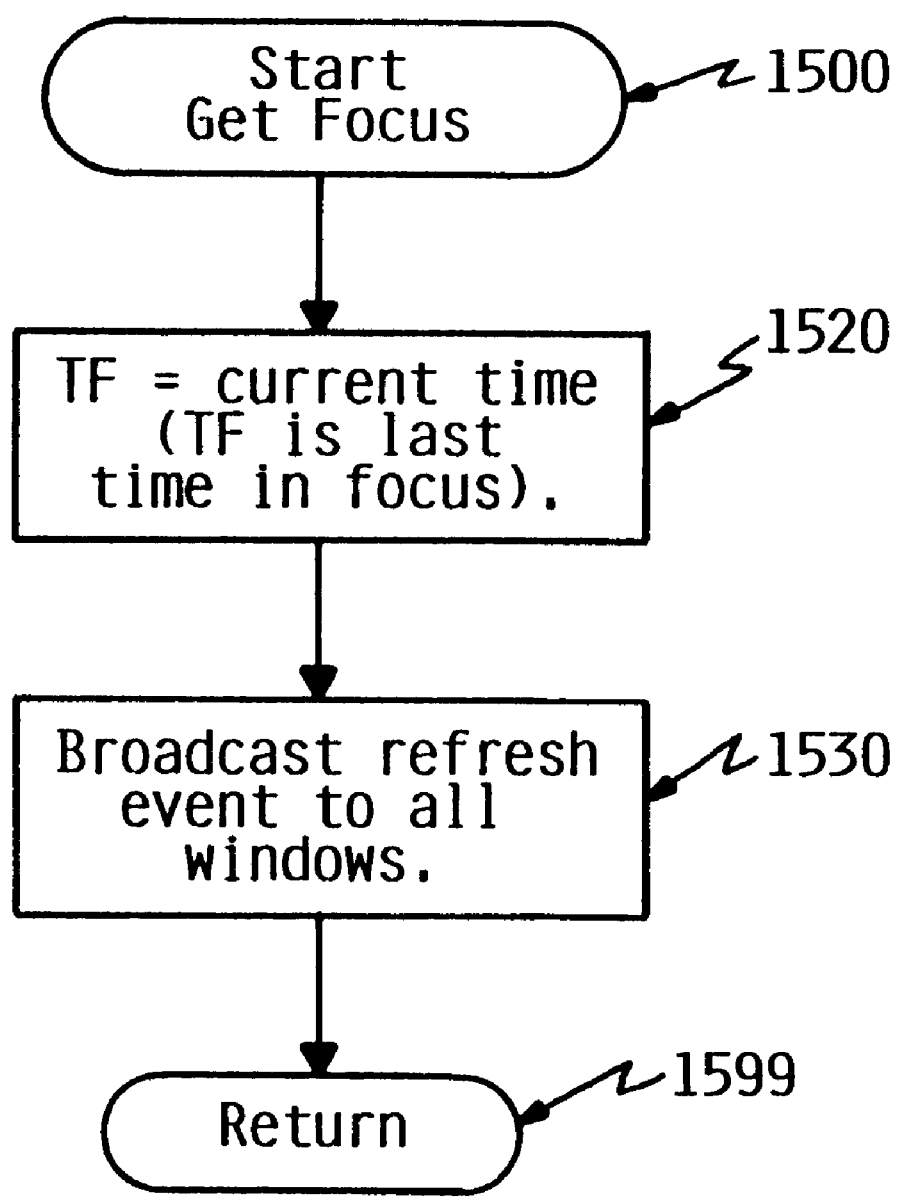

Referring to FIG. 15, there is illustrated sample logic for the portion of controller 399 that processes the get-focus event. The get-focus event occurs as a result of the user selecting a window to be brought to the front of the desktop. At block 1500, control begins. Control then continues to block 1520 where controller 399 sets the last time in focus for the selected window to be the current time. Control then continues to block 1530 where controller 399 broadcasts a refresh event to all windows. Control then continues to block 1599 where the function returns.

Figure 16:
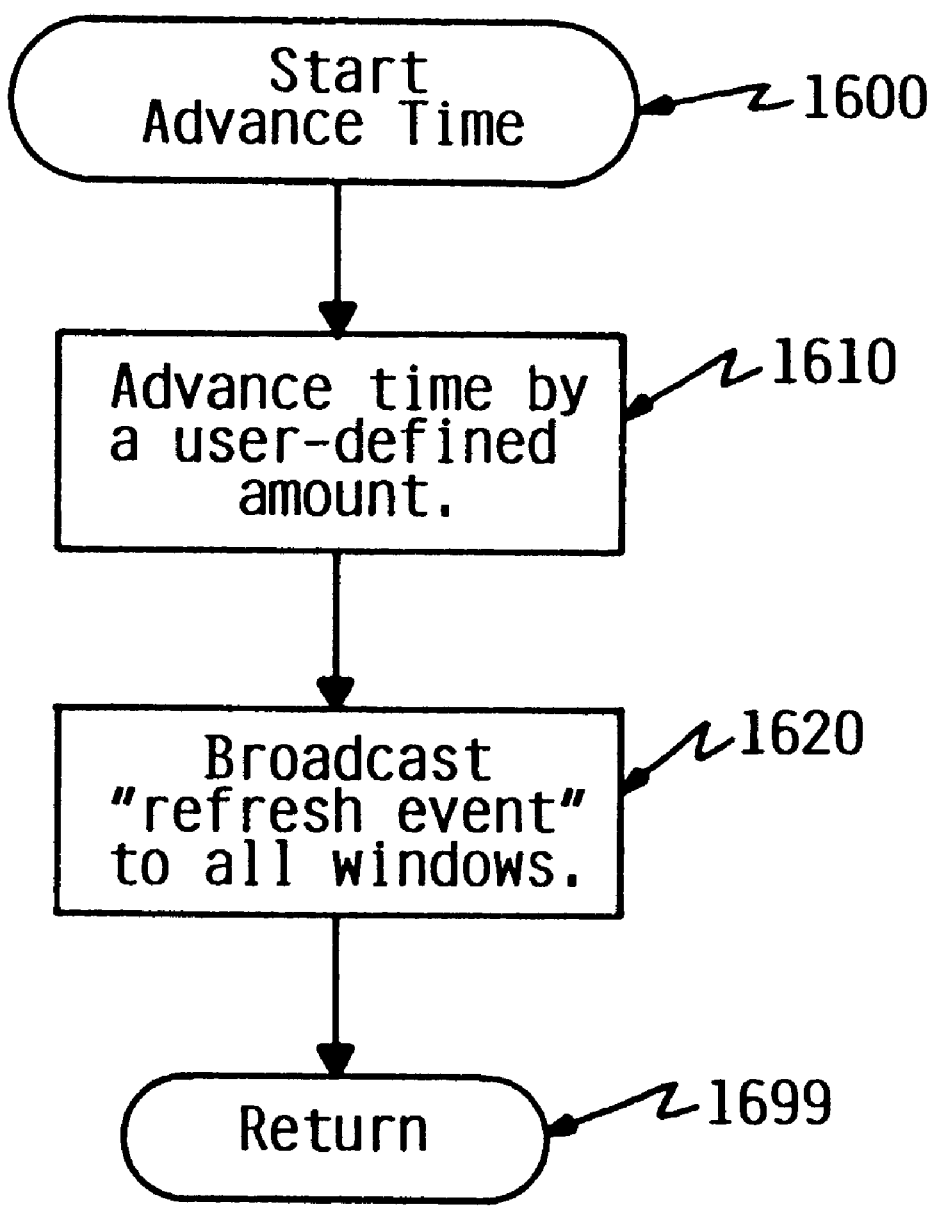

Referring to FIG. 16, there is illustrated sample logic for the portion of controller 399 that processes the advance-time event. At block 1600, control starts. Control then continues to block 1610 where controller 399 advances time by a user-specified amount. Control then continues to block 1620 where controller 399 broadcasts a refresh event to all windows. Control then continues to block 1699 where the function returns.

Figure 17:
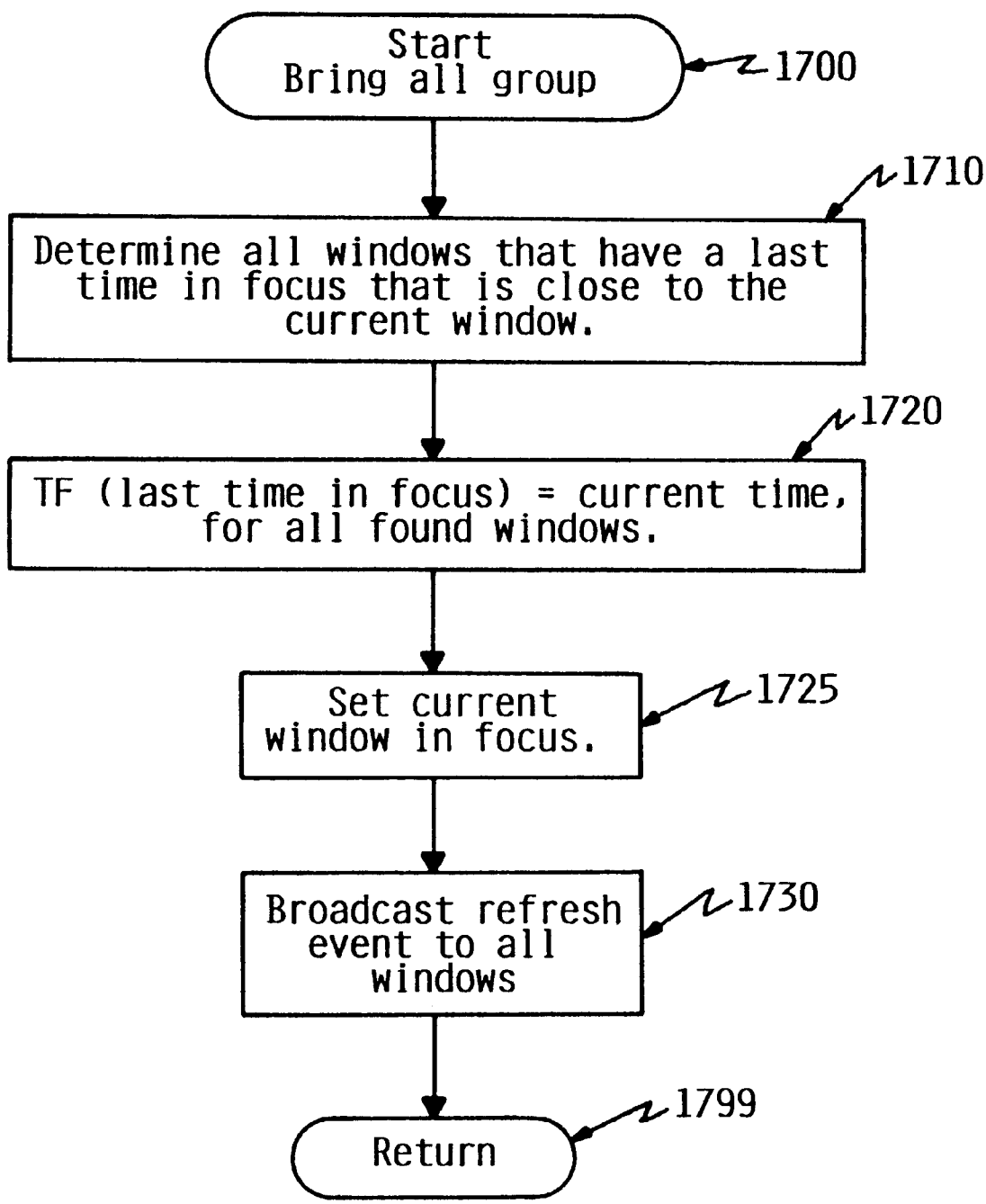

Referring to FIG. 17, there is illustrated sample logic for the portion of controller 399 that processes the bring-all-grouped-windows-to-front event. The bring-all-grouped-windows-to-front event occurs in response to the user requesting that a group of windows be brought to the front of the desktop. At block 1700, control starts. Control then continues to block 1710 where controller 399 determines all of the windows that have a last time in focus that is close to the current window, where closeness of windows is determined using a predetermined distance constant. In an alternative embodiment, the user selects the windows in the group. Control then continues to block 1720 where controller 399 sets the last time in focus to be the current time for all of the windows that were previously found at block 1710. Control then continues to block 1730 where controller 399 broadcasts a refresh event to all windows. Control then continues to block 1799 where the function returns.

While this invention has been described with respect to the preferred and alternative embodiments, it will be understood by those skilled in the art that various changes in detail may be made therein without departing from the spirit, scope, and teaching of the invention. For example, windows may become widely employed in consumer applications such as operator panels for consumer electronics, appliances, and automobiles. Accordingly, the herein disclosed invention is to be limited only as specified in the following claims.

What is claimed is:

1. A method for displaying windows comprising:
    displaying a plurality of windows on a display wherein, at any one time one of the windows is in focus, and wherein each of the windows has an original position and an original size on the display;
    determining, for each window, an elapsed time since it was most recently in focus;
    changing the position and size of each window in proportion to its elapsed time; and
    in response to receiving a user selected time, changing each window to a size and position associated with the user selected time.

2. The method of claim 1, wherein the changing step further comprises:
    moving the position of each window toward the border of the display in proportion to its elapsed time.

3. The method of claim 1, wherein the changing step further comprises:
    shrinking the size of each window in proportion to its elapsed time.

4. The method of claim 1, further comprising:
    repeatedly setting a timer with a predetermined amount of time, and in response to the timer expiration, performing the determining and changing steps.

5. The method of claim 3, wherein the changing step further comprises:
    minimizing each window to an icon when its window size reaches a predetermined size.

6. The method of claim 1, further comprising:
    restoring a selected window to its original position and size.

7. The method of claim 6, further comprising:
    finding a window with a focus time that is more recent than the last-time-in-focus of the selected window; and
    erasing the found window from the display.

8. The method of claim 1, further comprising:
    determining a last-time-in-focus for a selected window; and
    finding all windows having a last-time-in-focus that is within a predetermined amount-of-time to the last-time-in-focus of the selected window.

9. The method of claim 8, further comprising:
    restoring all windows found in the finding step to the original position and size.

10. The method of claim 1, wherein the original size and position were requested by a user.

11. The method of claim 1, further comprising determining a current time, and wherein the user selected time is later than the current time.

12. The method of claim 1, wherein the user selected time is a last-time-in-focus for a selected window.

13. A program product that, when read and executed by a computer, displays windows, comprising:
    a controller that displays a plurality of windows on a display wherein, at any one time one of the windows is in focus, and wherein each of the windows has an original position and an original size on the display, and wherein the controller determines, for each window, an elapsed time since it was in focus, and changes the position and size of each window in proportion to its elapsed time, and wherein, in response to receiving a user selected time, the controller changes each window to a size and position associated with the user selected time; and
    signal-bearing media bearing the controller.

14. The program product of claim 13, wherein the controller further:
    moves the position of each window toward the border of the display in proportion to its elapsed time.

15. The program product of claim 13, wherein the controller further:
    shrinks the size of each window in proportion to its elapsed time.

16. The program product of claim 13, wherein the controller further:
    repeatedly sets a timer with a predetermined amount of time, and in response to the timer expiration, performs the determining and changing functions.

17. The program product of claim 15, wherein the controller further:
    minimizes each window to an icon when its window size reaches a predetermined size.

18. The program product of claim 13, wherein the controller further:
    restores a selected window to its original position and size.

19. The program product of claim 18, wherein the controller further:
    finds a window with a focus time that is more recent than a last-time-in-focus of the selected window, and
    removes the found window from the display.

20. The program product of claim 13, wherein the controller further:
    determines a last-time-in-focus for a selected window, and
    finds all windows having a last-time-in-focus that is within a predetermined amount-of-time to the last-time-in-focus of the selected window.

21. The program product of claim 20, wherein the controller further:
    restores all found windows to their original position and size.

22. The program product of claim 13, wherein the original size and position were requested by a user.

23. The program product of claim 13, wherein the controller further:
    determines a current time, and wherein the user selected time is later than the current time.

24. The program product of claim 13, wherein the user selected time is a last-time-in-focus for a selected window.

25. An apparatus comprising:
    a processor;
    memory coupled to the processor; and a controller residing in the memory and executing on the processor, wherein the controller displays a plurality of windows on a display wherein, at any one time one of the windows is in focus, and wherein each of the windows has an original position and an original size on the display, and wherein the controller determines, for each window, an elapsed time since it was in focus, and changes the position and size of each window in proportion to its elapsed time, and wherein, in response to receiving a user selected time, the controller changes each window to a size and position associated with the user selected time.

26. The apparatus of claim 25, wherein the controller further:

moves the position of each window toward the border of the display in proportion to its elapsed time.

27. The apparatus of claim 25, wherein the controller further:

shrinks the size of each window in proportion to its elapsed time.

28. The apparatus of claim 25, wherein the controller further:

repeatedly sets a timer with a predetermined amount of time, and in response to the timer expiration, performs the determining and changing functions.

29. The apparatus of claim 27, wherein the controller further:

minimizes each window to an icon when its window size reaches a predetermined size.

30. The apparatus of claim 25, wherein the controller further:

restores a selected window to its original position and size.

31. The apparatus of claim 30, wherein the controller further:

finds a window with a focus time that is more recent than a last-time-in-focus of the selected window, and removes the found window from the display.

32. The apparatus of claim 25, wherein the controller further:

determines a last-time-in-focus for a selected window, and finds all windows having a last-time-in-focus that is within a predetermined amount-of-time to the last-time-in-focus of the selected window.

33. The apparatus of claim 32, wherein the controller further:

restores all found windows to their original position and size.

34. The apparatus of claim 25, wherein the original size and position were requested by a user.

35. The apparatus of claim 25, wherein the controller further:

determines a current time, and wherein the user selected time is later than the current time.

36. The apparatus of claim 28, wherein the controller further:

determines a current time, and wherein the user selected time is later than the current time.

37. A method for displaying windows, the method comprising:

displaying a plurality of windows, wherein each window in the plurality of windows has a size and a position;

determining a last-time-in-focus for each window in the plurality of windows;

determining a current time;

for each window in the plurality of windows, automatically changing at least one of the window's size and the window's position if the last-time-focus is different than the current time; and in response to receiving a user selected time, changing the plurality of windows to a size and position associated with the user selected time.

* * * * *